Inventor
Paul S. Smith
By DesJardins & Compton
His Attorneys

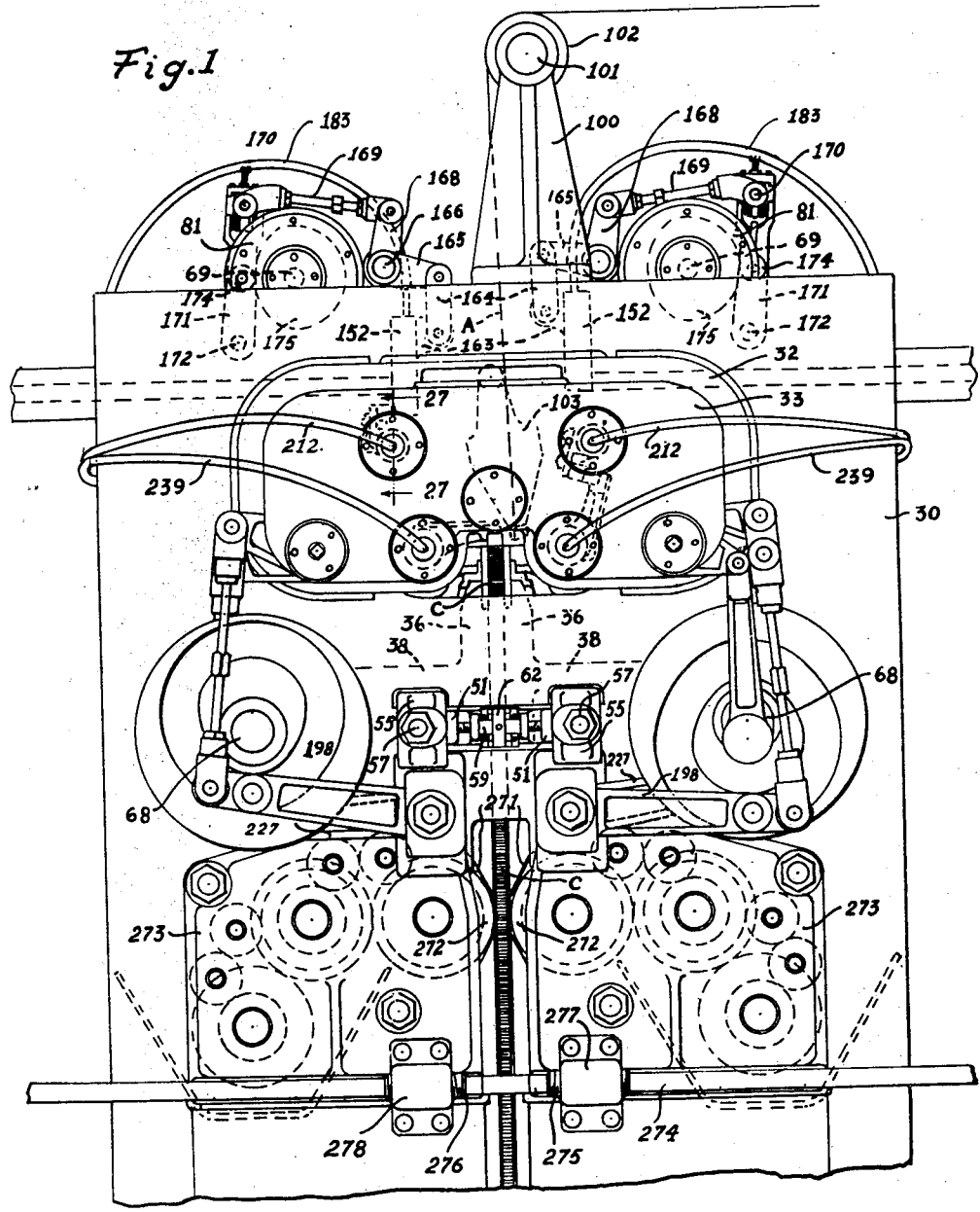

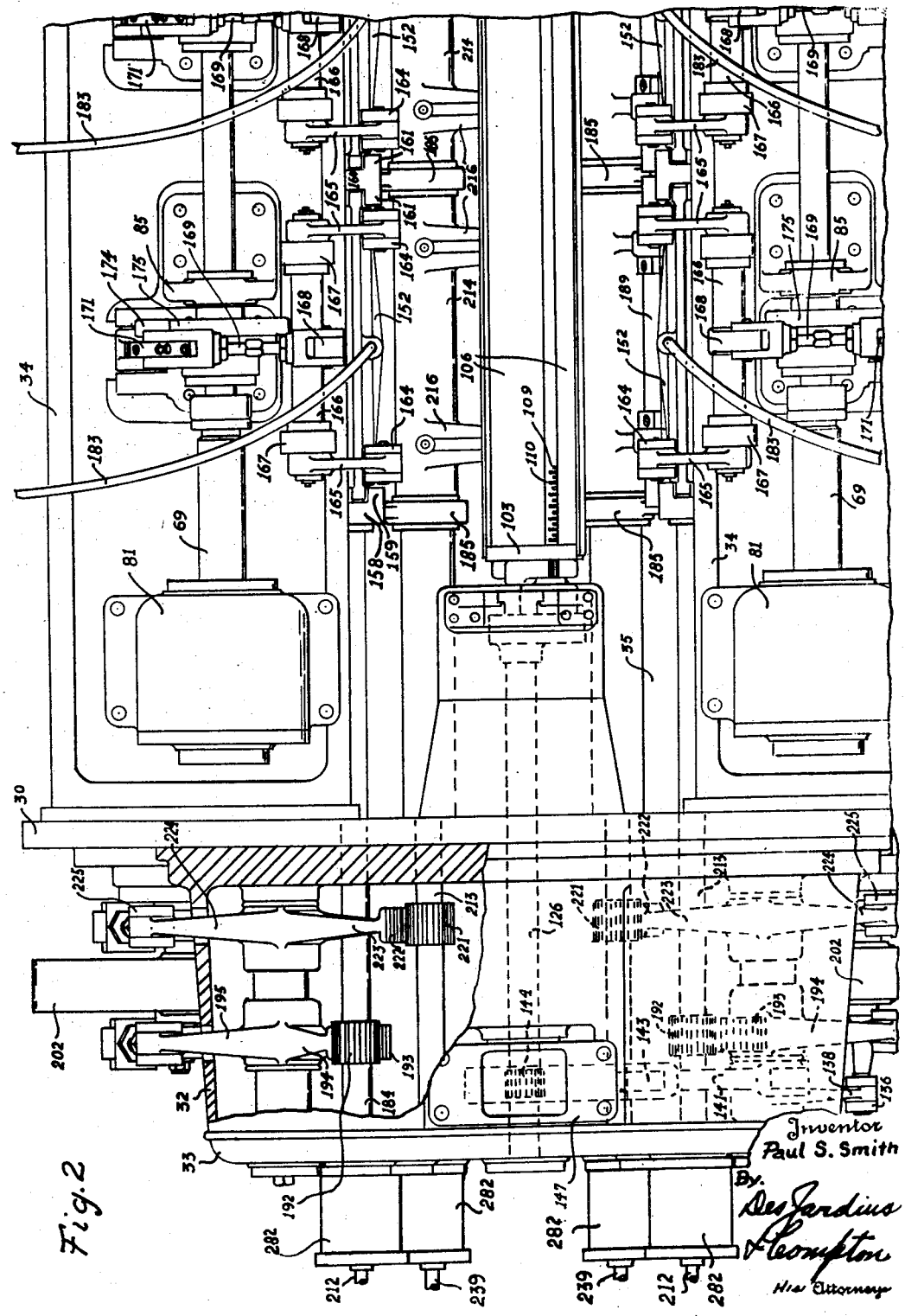

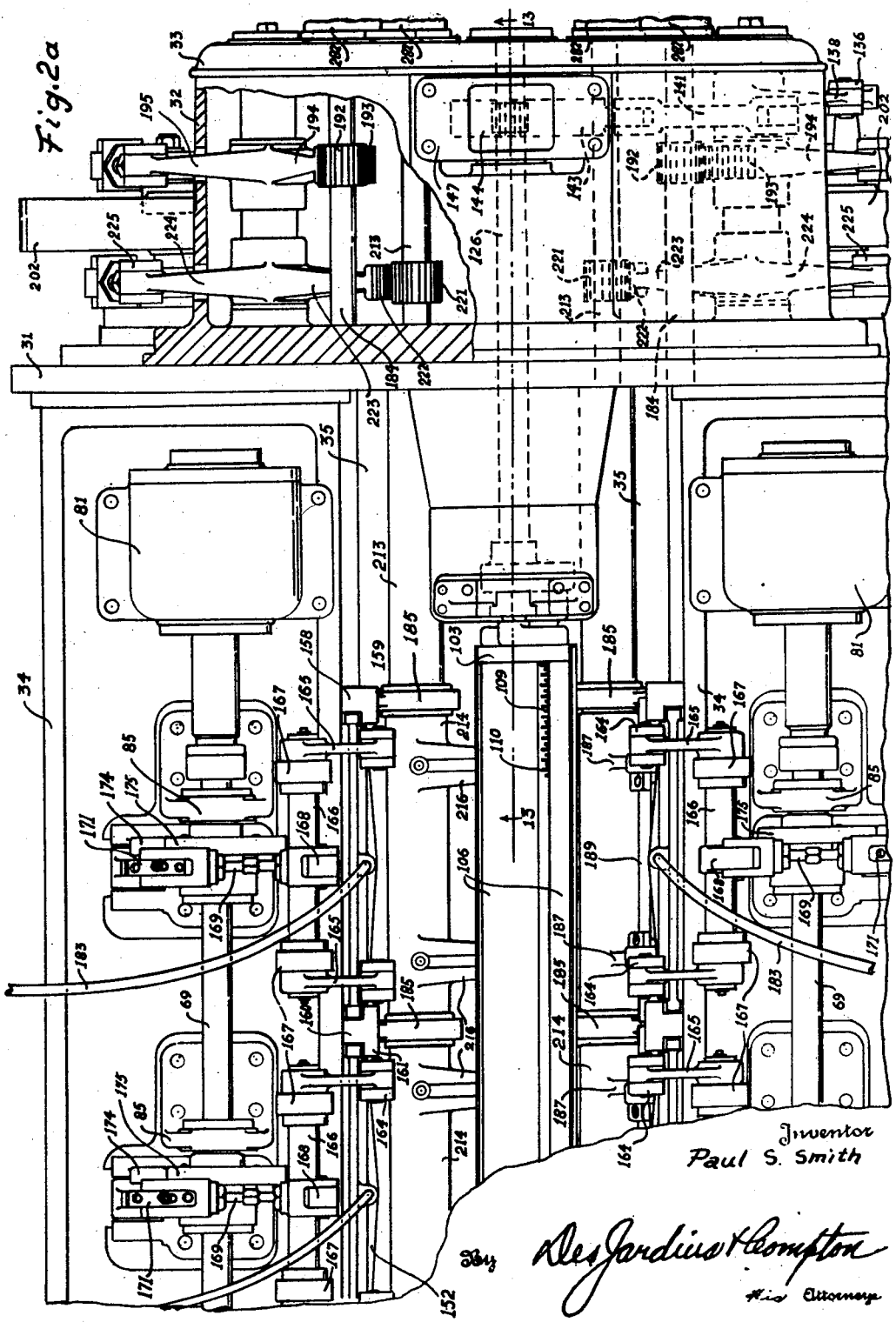

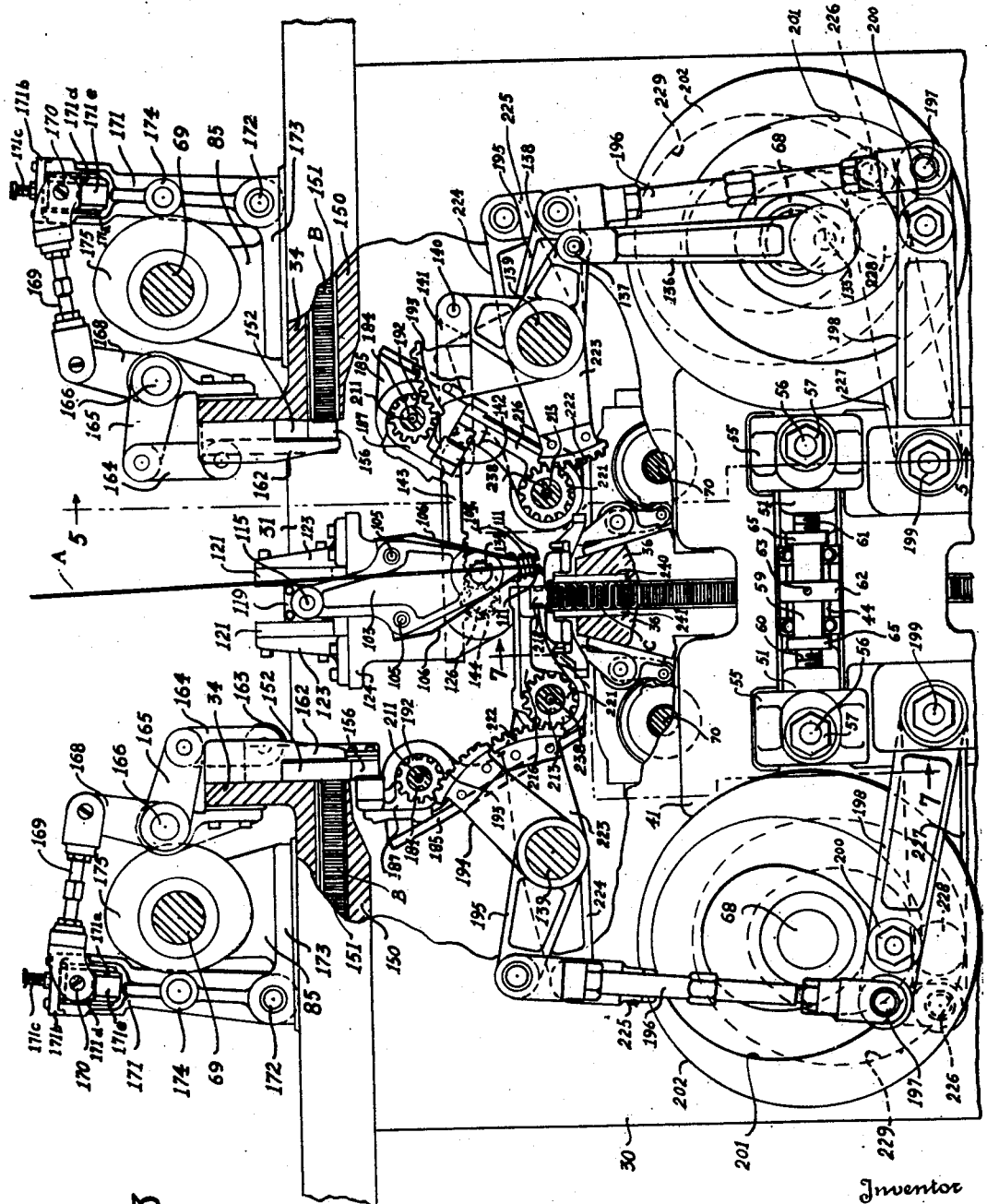

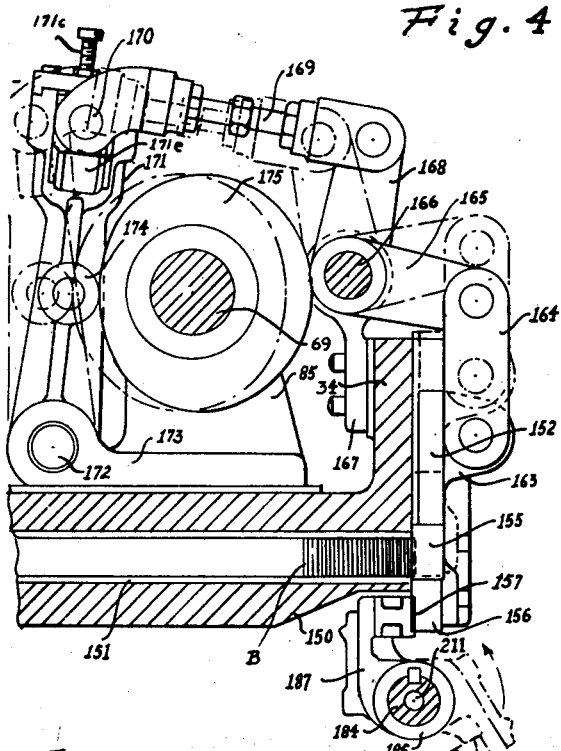
Fig. 4
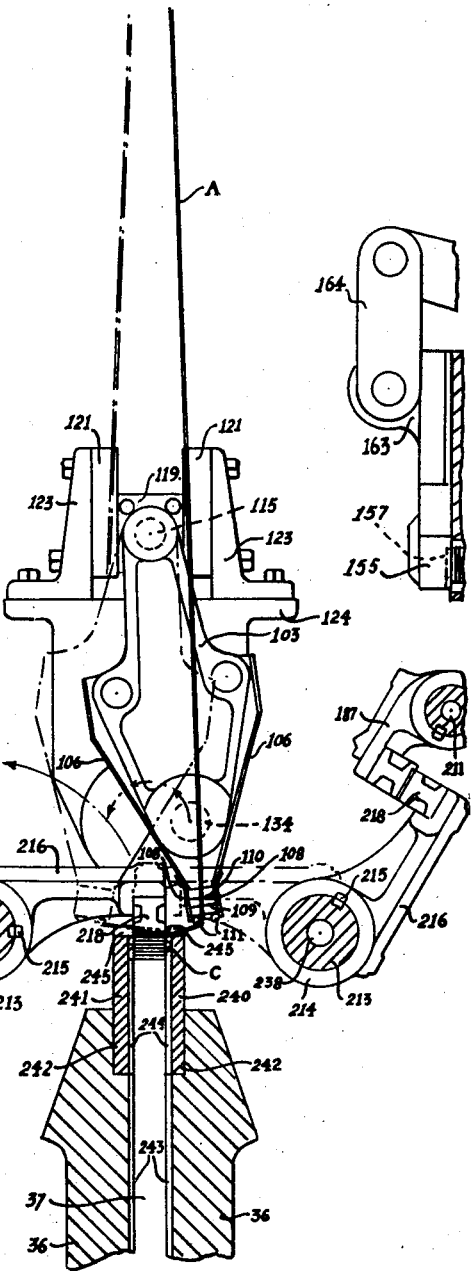
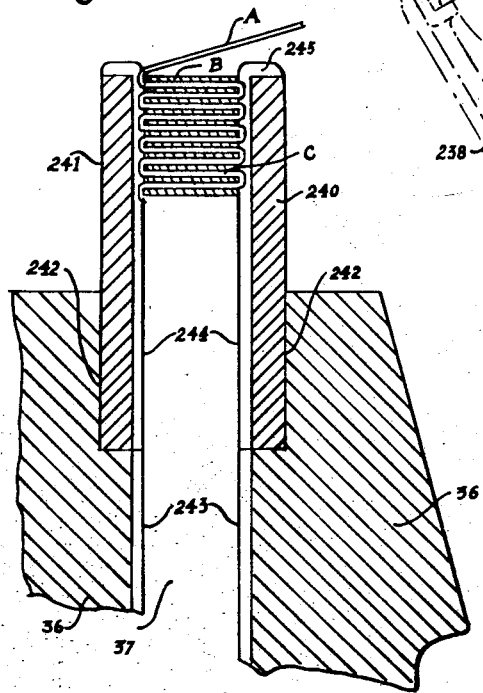
Fig. 4a

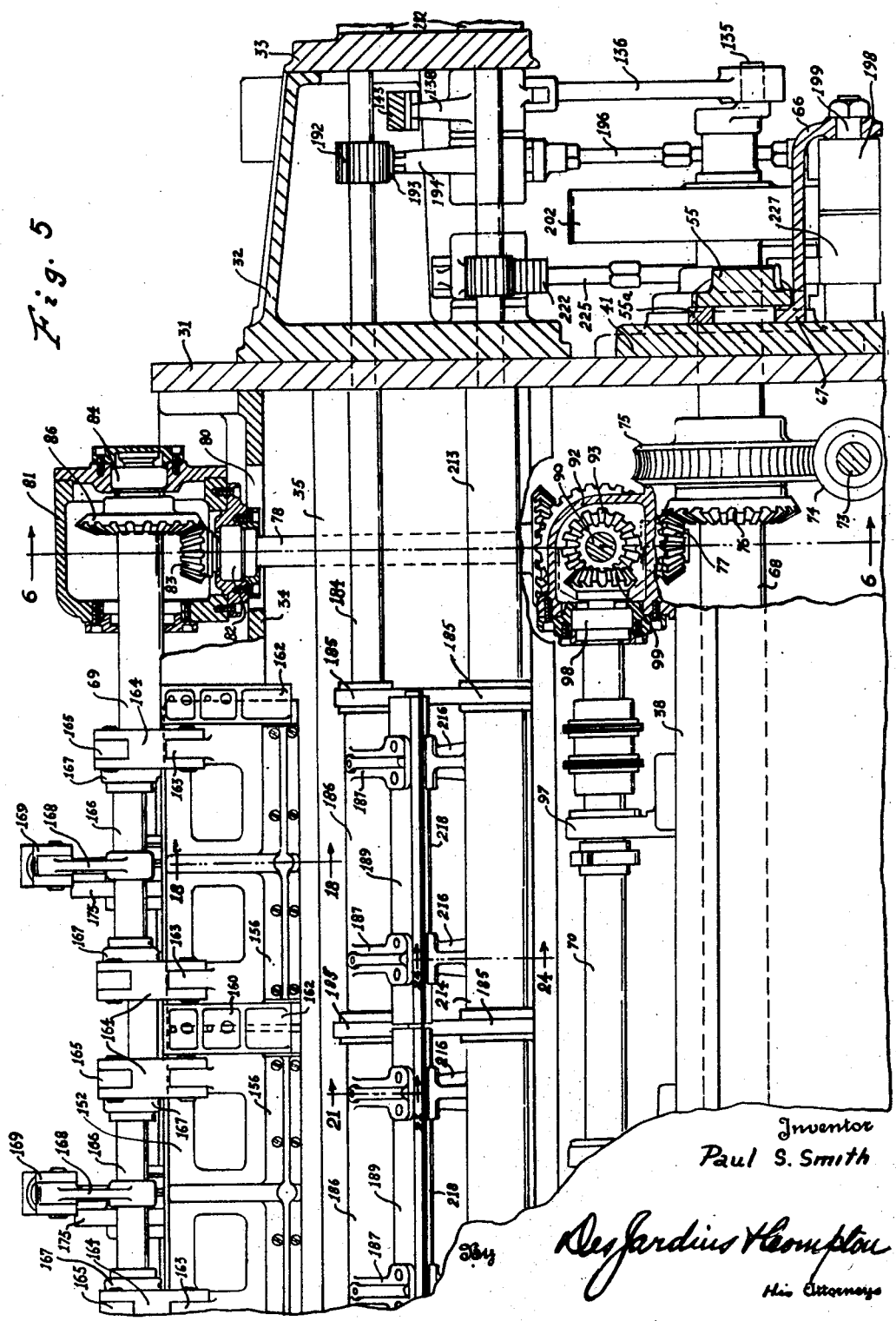

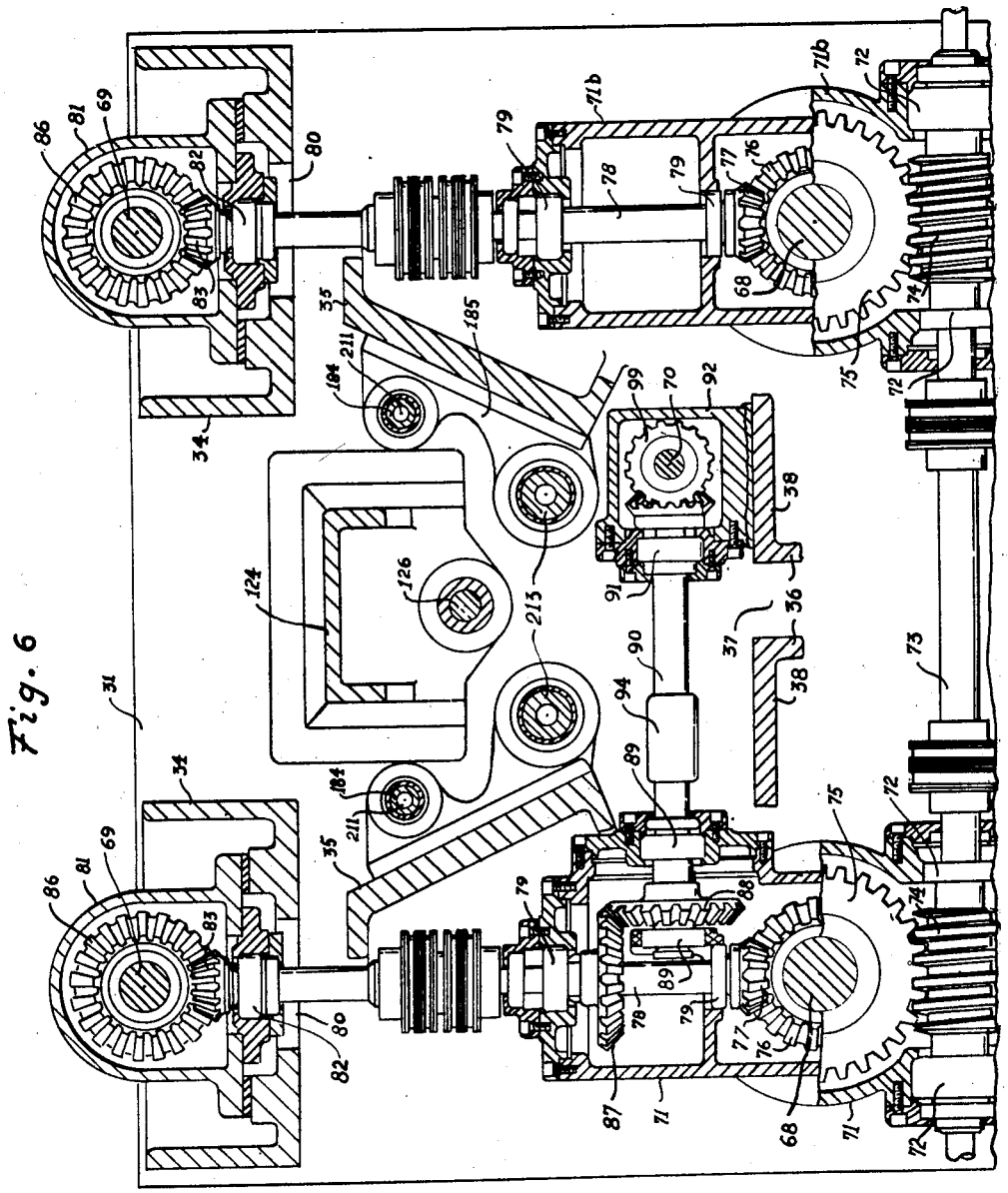

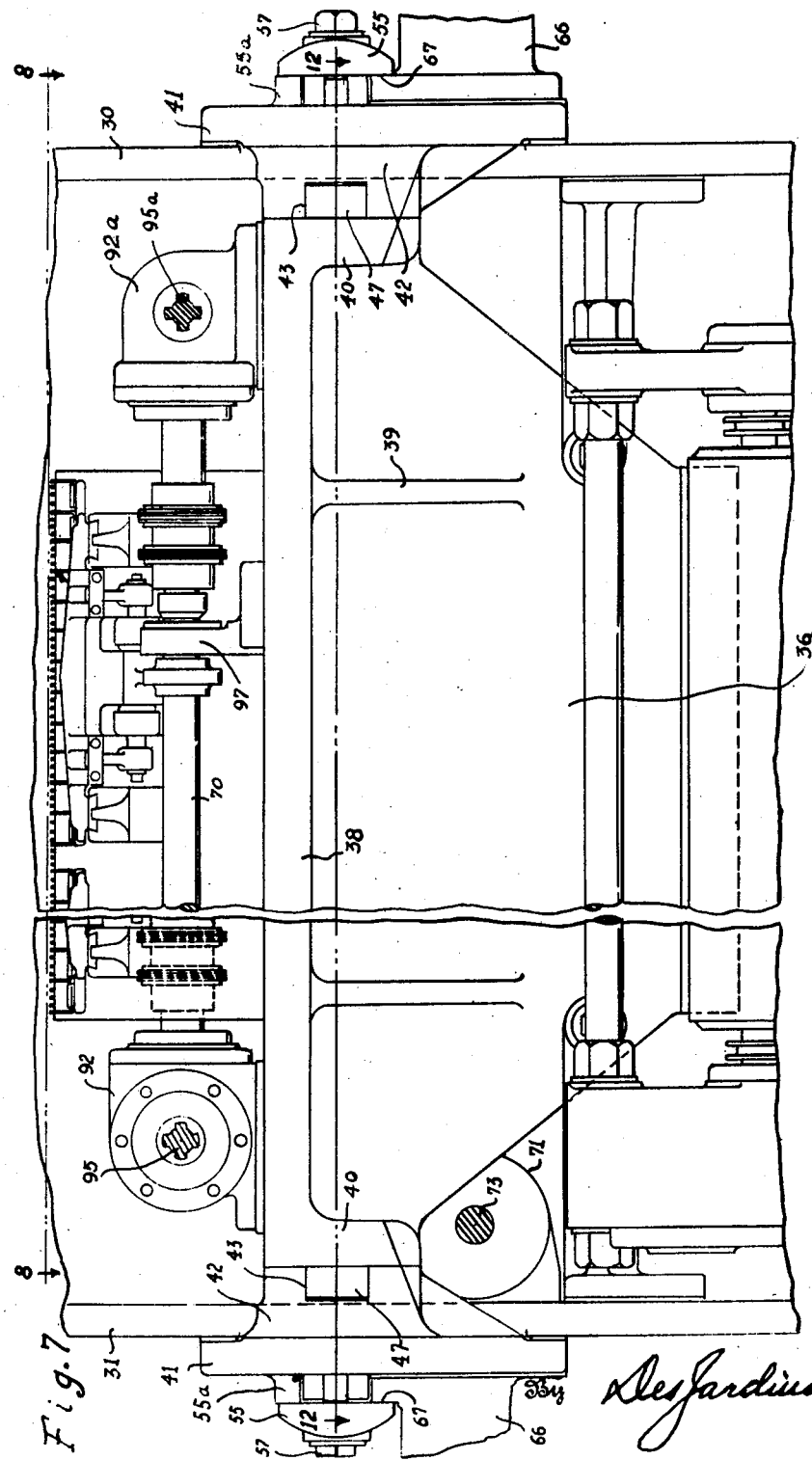

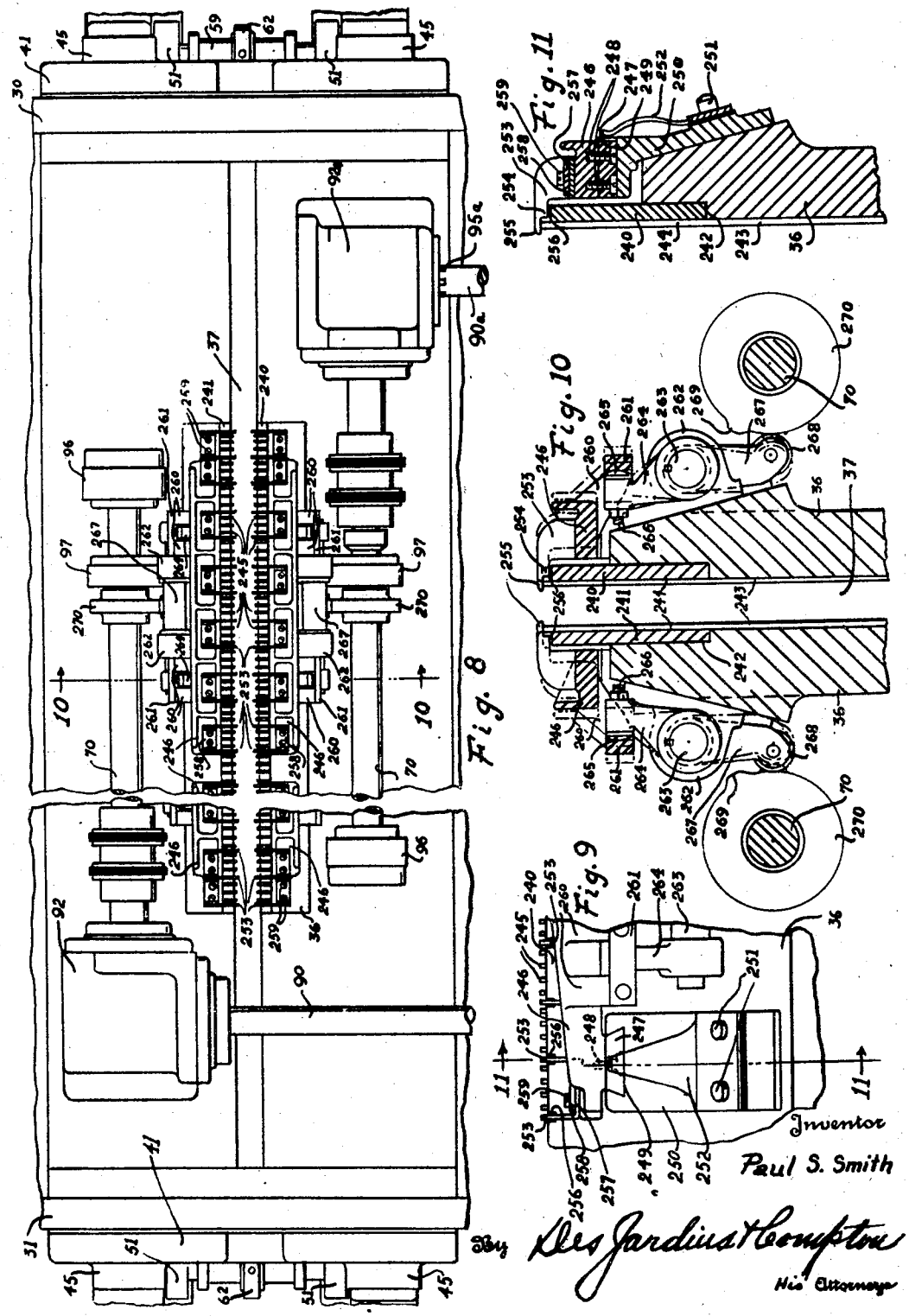

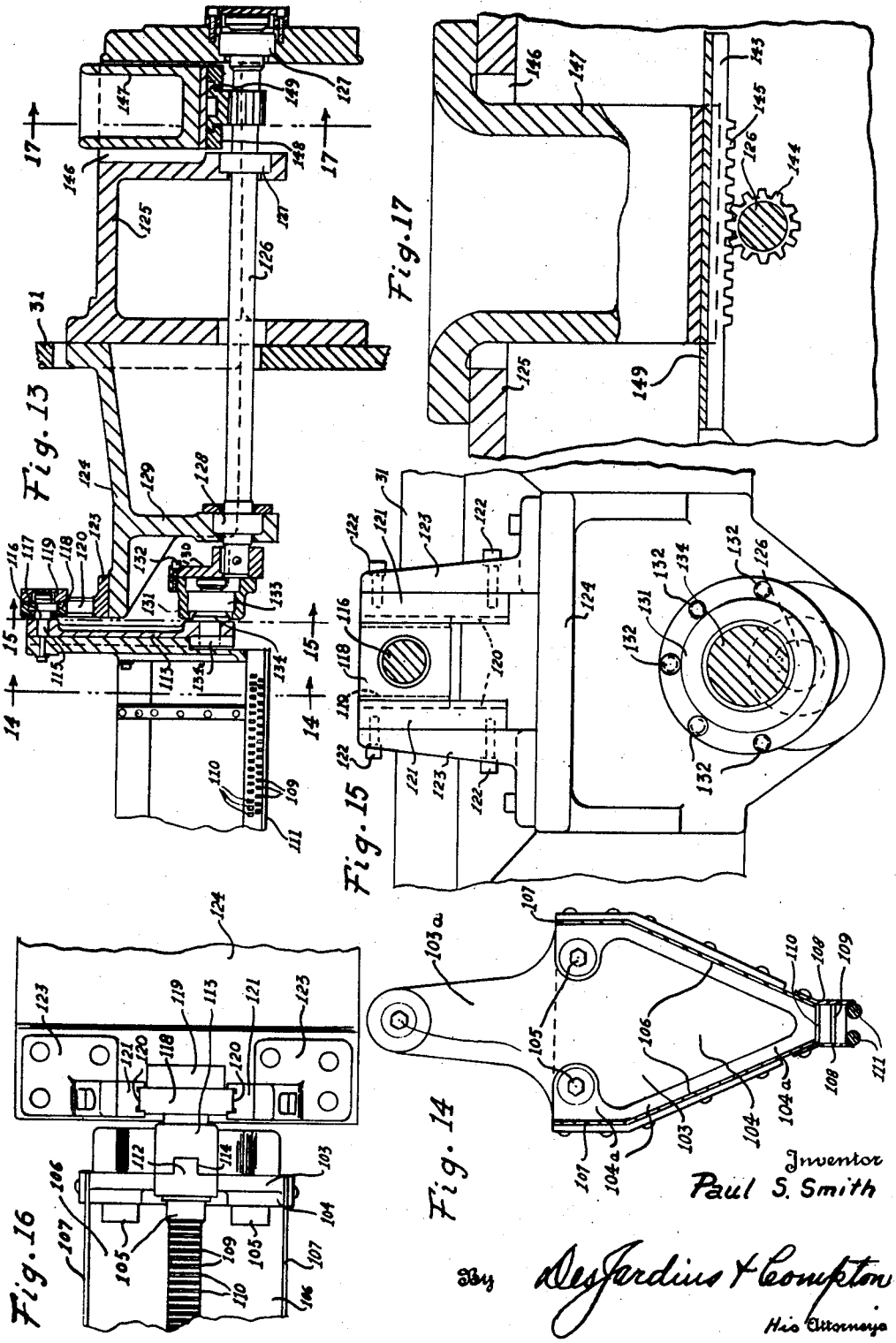

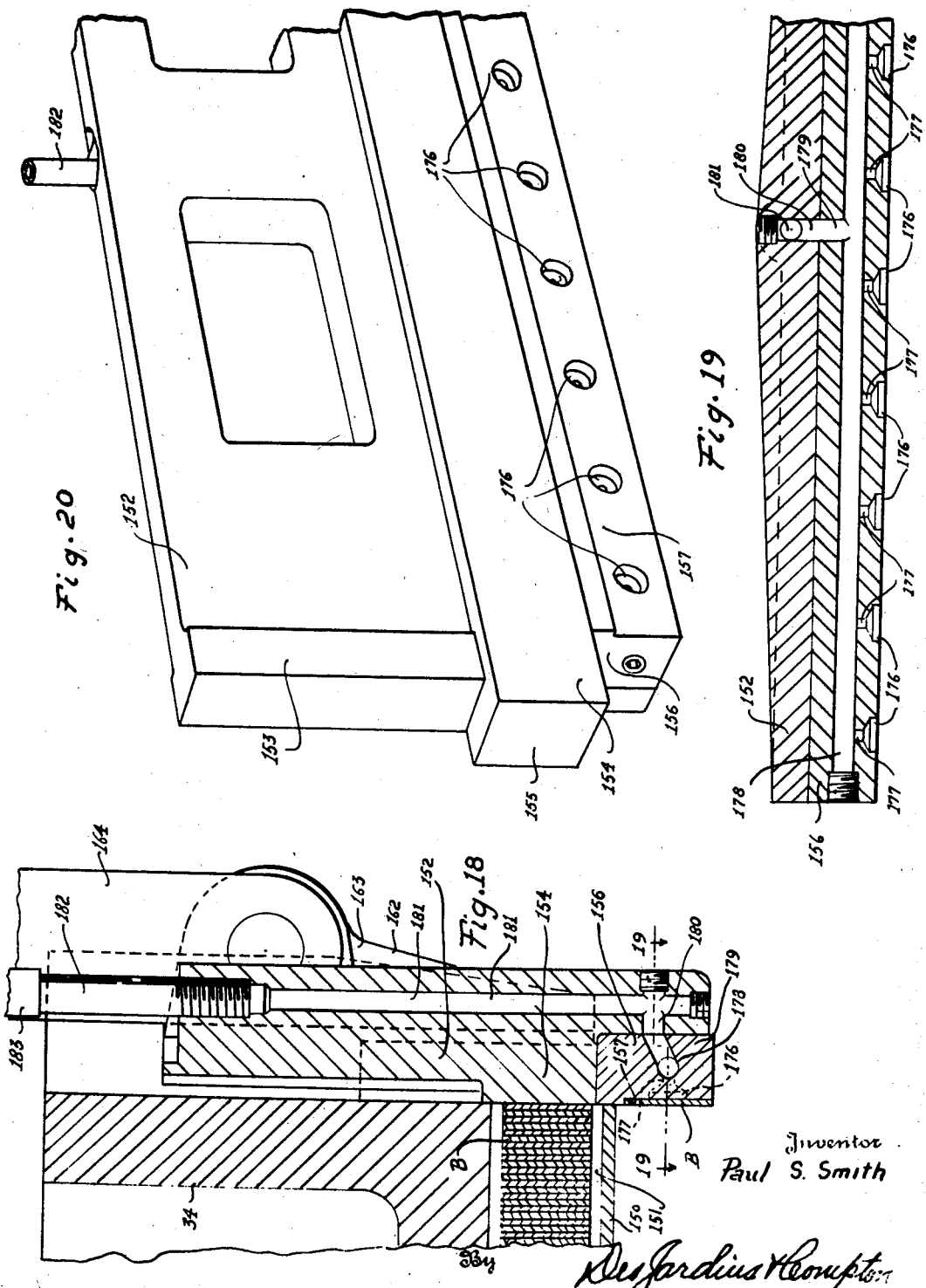

Feb. 14, 1950 — P. S. SMITH — 2,497,330
APPARATUS FOR MAKING CEMENTED PILE FABRIC
Filed Aug. 20, 1946 — 16 Sheets-Sheet 13
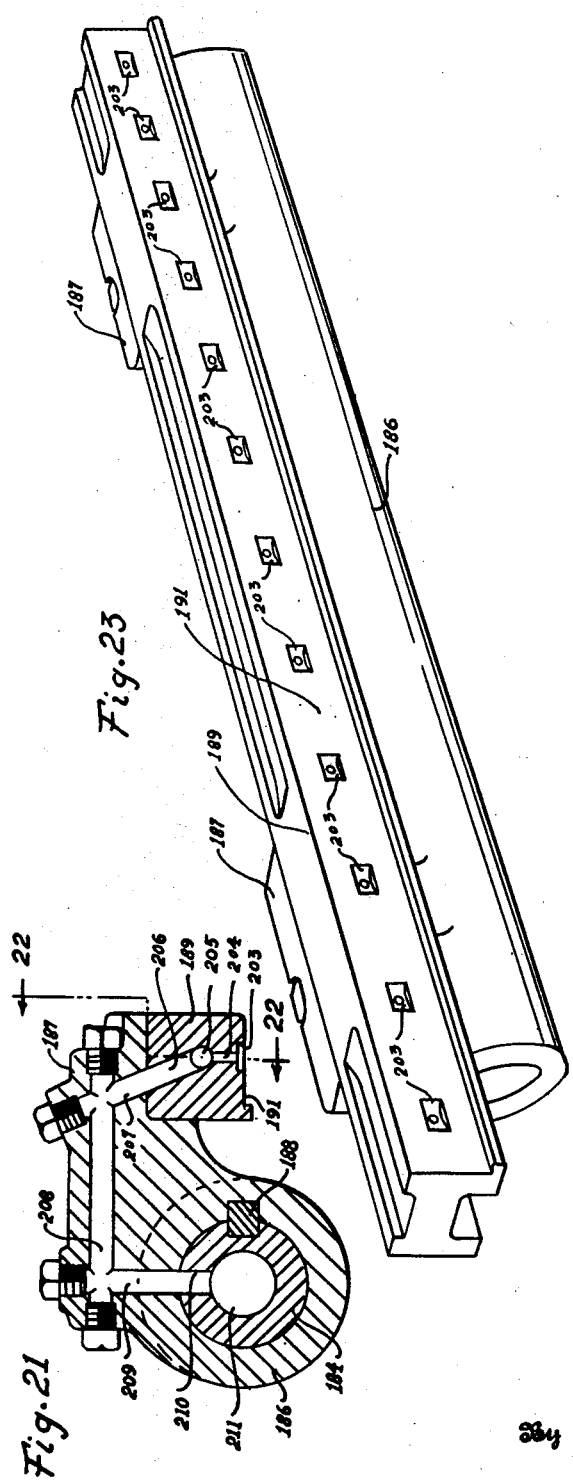
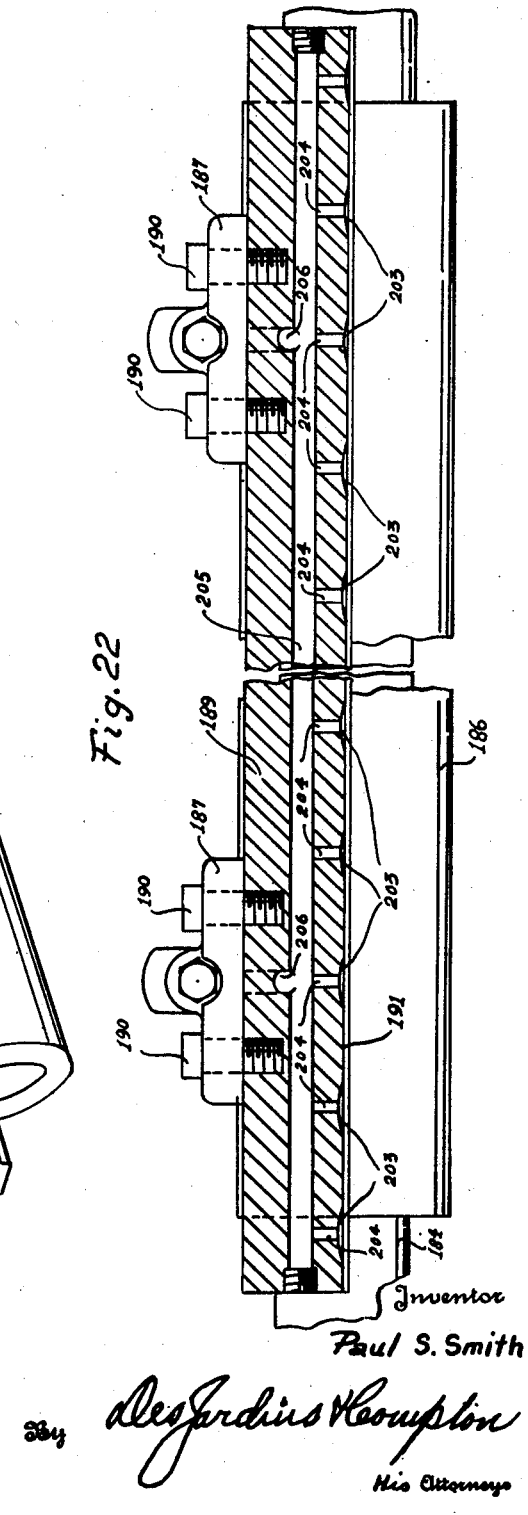
Inventor
Paul S. Smith
By DesJardins & Compton
His Attorneys

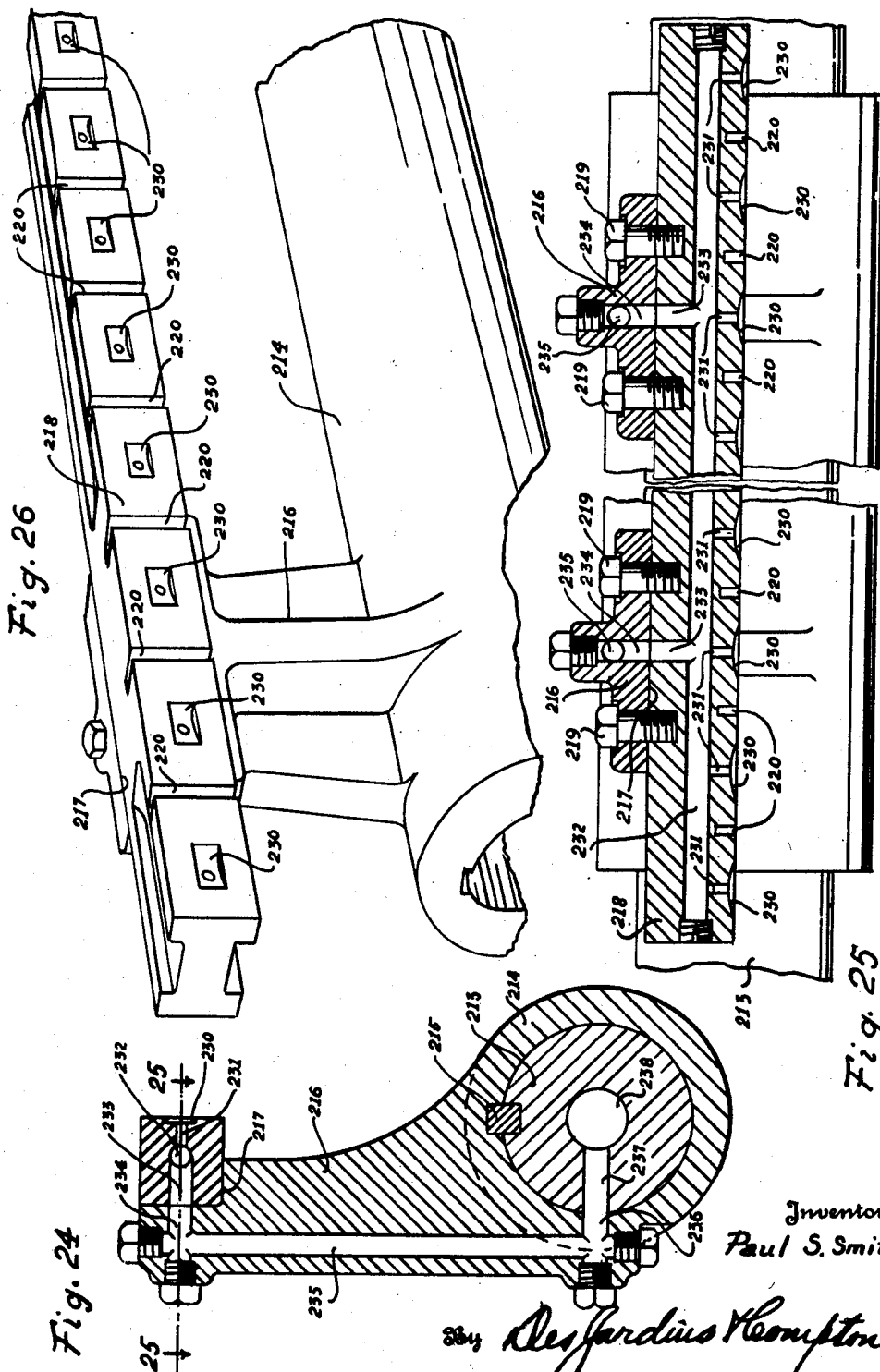

Feb. 14, 1950 P. S. SMITH 2,497,330
APPARATUS FOR MAKING CEMENTED PILE FABRIC
Filed Aug. 20, 1946 16 Sheets-Sheet 15
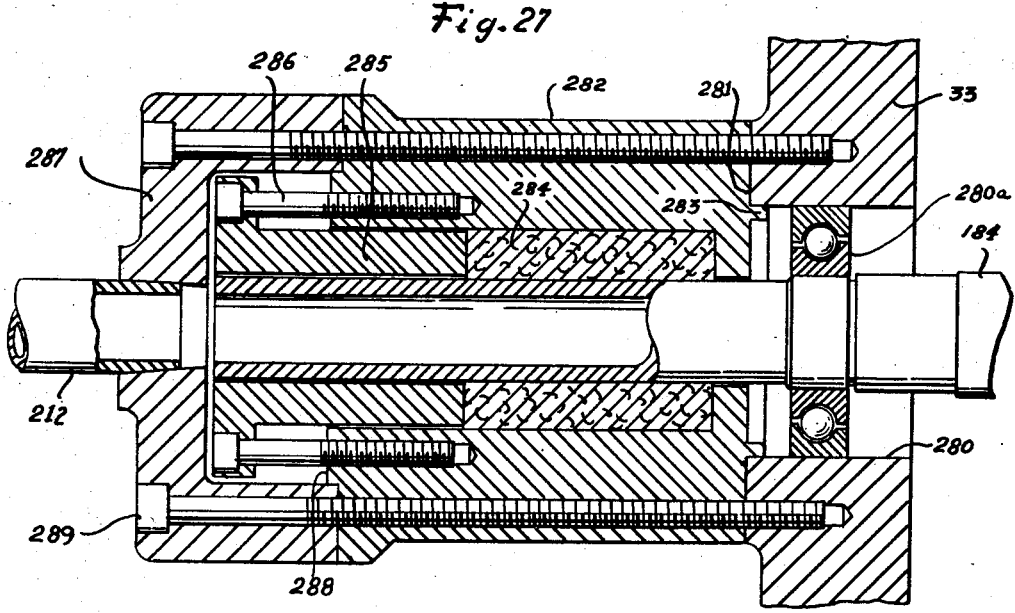
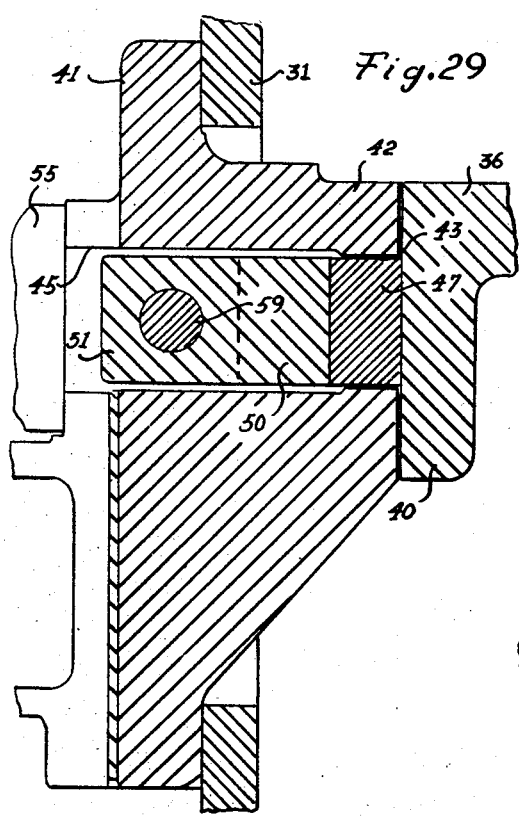
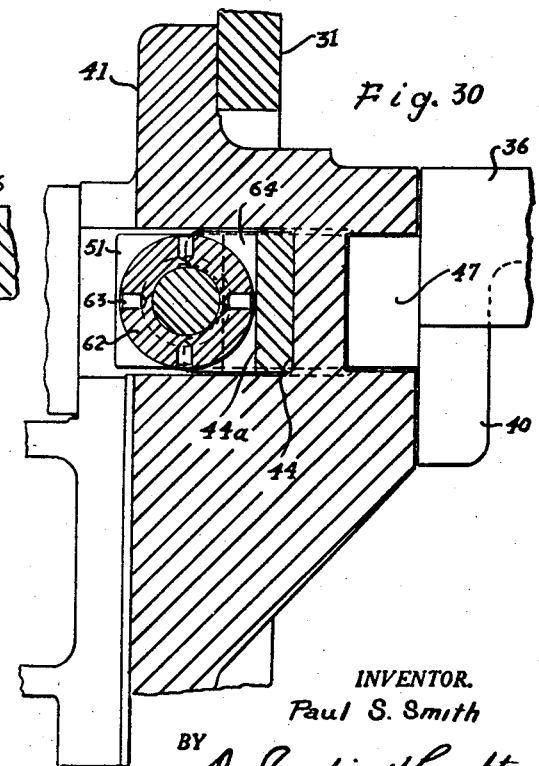
INVENTOR.
Paul S. Smith
BY
*DesJardins & Compton*
HIS ATTORNEYS Patented Feb. 14, 1950

2,497,330

UNITED STATES PATENT OFFICE 2,497,330

APPARATUS FOR MAKING CEMENTED PILE FABRIC

Paul S. Smith, Carlisle, Pa., assignor to C. H. Masland & Sons, Inc., Carlisle, Pa., a corporation of Pennsylvania Application August 20, 1946, Serial No. 691,795

40 Claims. (Cl. 154—1.1)

My invention relates to certain improvements in apparatus for making cemented pile fabric, that is to say, apparatus for use in the manufacture of that type of pile fabric, in which the fibers forming the pile are attached to a backing fabric by cementing material. My present invention relates to improvements upon the apparatus disclosed and claimed in United States Letters Patent, No. 2,050,740, patented to me on August 11, 1936; No. 2,302,722, patented to me on November 24, 1942; No. 2,312,129, patented to me on February 23, 1943, and No. 2,352,131, patented to me on June 20, 1944, and the apparatus forming the subject-matter of my present invention is useful in carrying out the method disclosed and claimed in United States Letters Patent, No. 2,051,010, patented to me on August 11, 1936.

It has long been known that pile fabric may be manufactured by cementing the fibers forming the pile to a backing sheet, or fabric, and the usual practice has been to attach such fibers to the backing sheet in looped form, with the looped portions of the pile fibers cemented to the backing sheet. Such fibers may be applied either in the form of yarn or as unspun fibers. The principal object of my present invention is to provide an improved apparatus, by means of which such cemented pile fabric can be manufactured at a lower cost than is possible by apparatus heretofore proposed or used.

A further object of my invention is to provide apparatus for producing cemented pile fabric automatically and continuously, which can be constructed at a much lower cost than machines for this purpose heretofore proposed or used, thus lowering the amount of capital necessarily invested in machines and equipment, and thereby reducing the cost of production.

A further object of my invention is to provide an improved apparatus for producing a cemented pile fabric, by means of which the speed of production can be greatly increased over machines and methods heretofore employed.

A further object of my invention is to provide an apparatus which will produce cemented pile fabric of improved character, the surface of which will be free of any ripple effect due to the machine on which it is made, avoiding the appearance of "wire marks" characteristic of certain types of cemented pile fabric.

A further object of my present invention is to provide an improved apparatus for making cemented pile fabric, which includes means for feeding separator strips from a supply, means for transferring these strips, one by one, to the mouth of a confining passage in which a plaited structure is built up from separator strips and a warp, and means for plaiting the warp about the separator strips as they are deposited in said passage.

Another object of my invention is to provide an improved plaiting mechanism, for plaiting the warp about the separator strips deposited in the mouth of the confining passage, which includes an improved warp guide and reed, whereby the spacing of the individual yarns of the warp is maintained.

A further object of my invention is to provide a plaiting mechanism that may be actuated at higher speeds than those known heretofore, inasmuch as the weight of the moving parts of the plaiting mechanism has been greatly reduced.

Another object of my present invention is to provide an apparatus which includes means for feeding separator strips successively from a supply to upper transfer devices, means for delivering said strips successively from said upper transfer devices to lower transfer devices, which deposit them, one by one, in the mouth of a confining passage, and a warp guide movable to and fro over the mouth of the confining passage, for plaiting the warp of yarns about the separator strips successively deposited.

A further object of my invention is to provide an apparatus for making cemented pile fabric, having improved means for transferring the separator strips, one by one, from the strip-feeding devices to the mouth of the confining passage.

A further object of my present invention is to provide improved means for retaining the strips in the mouth of the confining passage, as they are deposited therein successively by the operation of the machine.

A further object of my invention is to provide a warp guide of improved construction, and improved means for giving said warp guide the requisite movement to and fro over the mouth of the confining passage.

Another object of my present invention is to provide an improved mechanism for taking strips successively from a supply and depositing them one by one in the mouth of the confining passage, which mechanism includes strip-feed devices, upper transfer devices and lower transfer devices, the strip being delivered by the strip-feed devices to the upper transfer devices, and by the upper transfer devices to the lower transfer devices, and deposited by the later in the mouth of the passage.

A further object of my present invention is to provide a machine having improved means for varying the width of the confining passage, so that pile fabric having pile of varying depth may be made upon the machine.

Further objects, and objects relating to details of construction and economies of manufacture, will definitely appear from the detailed description to follow. In one instance, I have accomplished the objects of my invention by the devices and means set forth in the following specifications. My invention is clearly defined and pointed out in the appended claims. A structure constituting a preferred embodiment of my invention is illustrated in the accompanying drawing, forming a part of this specification, in which:

Fig. 1 is a view, in end elevation, of the upper portion of a machine embodying my invention.

Figs. 2 and 2A, taken together, are a fragmentary, top plan view of the machine, parts being shown in section.

Fig. 3 is a fragmentary view of the machine in end elevation, on a larger scale than Fig. 1, portions of the machine being shown in vertical section.

Fig. 4 is a vertical sectional view through a strip-feeding mechanism, a strip-transfer mechanism, the warp guide and the upper end of the confining passage, that receives the plaited structure as it is formed.

Fig. 4A is a vertical sectional view, on an enlarged scale, of the upper end of the confining passage and the plaited structure therein.

Fig. 5 is a fragmentary, vertical sectional view, taken on the line 5—5 of Fig. 3.

Fig. 6 is a vertical sectional view, taken on the line 6—6 of Fig. 5, showing certain of the driving connections to operating shafts of the machine.

Fig. 7 is a fragmentary, vertical sectional view, taken on the line 7—7 of Fig 3.

Fig. 8 is a fragmentary, horizontal sectional view, taken on the line 8—8 of Fig. 7.

Fig. 9 is a fragmentary view, corresponding to a part of Fig. 7 on an enlarged scale, illustrating the means for retaining the separator strips as they are deposited in the mouth of the confining passage.

Fig. 10 is a detail, sectional view, taken on the line 10—10 of Fig. 8.

Fig. 11 is a detail, sectional view, taken on the line 11—11 of Fig. 9.

Fig. 13 is a fragmentary, vertical sectional view, taken on the line 13—13 of Fig. 2A, and showing the mounting for the warp guide and the means for oscillating it.

Fig. 14 is a vertical sectional view through the warp guide, taken on the line 14—14 of Fig. 13.

Fig. 15 is a vertical sectional view, taken on the line 15—15 of Fig. 13.

Fig. 16 is a fragmentary, top plan view of the warp guide and its mounting.

Fig. 17 is a detail, vertical sectional view, taken on the line 17—17 of Fig. 13.

Fig. 18 is an enlarged, vertical sectional view through one of the strip-feed slides, taken on the line 18—18 of Fig. 5.

Fig. 19 is a horizontal sectional view, taken on the line 19—19 of Fig. 18.

Fig. 20 is a fragmentary, perspective view of a strip-feed slide.

Fig. 21 is a detail, vertical sectional view of an upper strip-transfer device, taken on the line 21—21 of Fig. 5.

Fig. 22 is a fragmentary, vertical sectional view, taken on the line 22—22 of Fig. 21.

Fig. 23 is a fragmentary, perspective view of the device shown, in section, in Figs. 21 and 22.

Fig. 24 is a detail, vertical sectional view of a lower strip-transfer device, taken on the line 24—24 of Fig. 5.

Fig. 25 is a fragmentary, horizontal sectional view, taken on the line 25—25 of Fig. 24.

Fig. 26 is a fragmentary, perspective view of the device shown, in section, in Figs. 24 and 25.

Fig. 27 is a detail sectional view through one of the stuffing boxes, taken on the line 27—27 of Fig. 1.

Fig. 29 is a detail, sectional view taken on the line 29—29 of Fig. 12, and

Fig. 30 is a detail, sectional view taken on the line 30—30 of Fig. 12.

In the drawings, the same reference numerals refer to the same parts throughout the several views, and the sectional views are taken looking in the direction of the arrows at the ends of the section lines.

Figure 12:
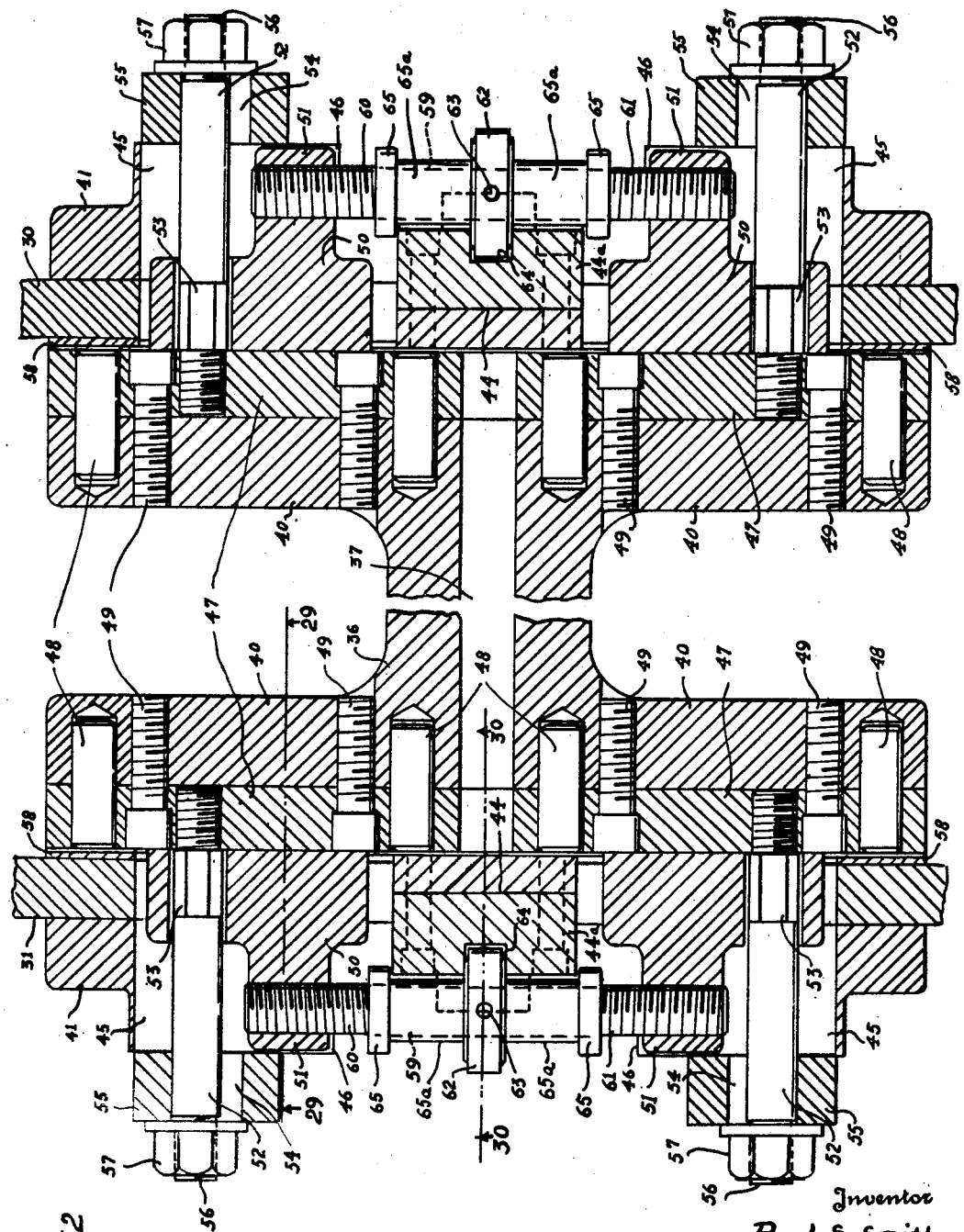
Fig. 12 is a fragmentary, horizontal sectional view, on an enlarged scale, taken on the line 12—12 of Fig. 7.

The improved apparatus forming the subject-matter of my present invention is for use in carrying out the method of making cemented pile fabric, which comprises plaiting either a wrap of spun yarns, or a web or bat of unspun fibers, about a series of separator strips so that the warp will pass around the edge of one strip, over that strip and around the opposite edge of the strip next above it, over the face of that strip and around the opposite edge of the one next above it, and so on, thus folding the fibrous warp alternately about the spaced separator strips. The function of these separator strips is to hold the strands in proper relation to each other, while they are cemented to a backing sheet or sheets, and, to facilitate the removal of these separator strips at a certain stage in manufacture, they should be formed of a material which can be severed readily. The plaited structure, comprising these severable separator strips and the fibers plaited about them, is formed in a confining passage and, as it emerges from this passage, a cementing material is applied to opposite faces thereof. This cementing material is then dried and webs of cemented base fabric are applied to opposite faces of the plaited structure and vulcanized thereto, after which the plaited structure is split longitudinally giving two identical webs of cemented pile fabric, each of which may be subjected to a beating operation, for the purpose of removing the severed separator strips, a combing or tigering operation to arrange the pile fibers in substantial parallelism and to open the severed end of the yarns to improve the coverage, and a final shearing operation by which such fibers are cut to secure a level surface.

The machine includes a pair of spaced members defining between them a passage, in which the plaited structure is formed, confined and advanced. One feature of my present invention consists in providing means for adjusting said members toward and from each other, so as to vary the width of the confining passage, whereby to provide for the formation of plaited structures of varying thickness.

Another feature of my present invention consists in means for feeding separator strips, one by one, from suitable magazines and delivering said strips to upper transfer devices, means for actuating the upper transfer devices to transfer the strips so delivered to lower transfer devices, and means for actuating said lower transfer devices to transfer the strips so delivered and deposit them, one by one, in the mouth of the confining passage, together with means for plaiting a warp of yarns about the separator strips to form the plaited structure. It is to be noted that the means for plaiting the warp of yarns about the separator strips does not serve as a means for depositing the strips in the mouth of the confining passage, but is so timed as to cooperate with the lower transfer devices, which deposit the strips.

Another feature of my present invention consists in an improved form of plaiting mechanism, consisting of a warp guide or reed, through which the warp of yarns passes on its way to the mouth of the confining passage, and which is so constructed as to hold the yarns of the warp in proper lateral spacing. Means are provided for rocking the warp guide back and forth over the mouth of the confining passage, so that the throat of the warp guide describes an approximately semicircular path over the mouth of said passage. This movement of the warp guide is so timed, with respect to the movement of the lower transfer devices, as to carry the warp guides out of the path of said lower transfer devices, as they deposit a separator strip in the mouth of said confining passage.

Another feature of my present invention comprises an improved retaining means, for retaining the separator strips in the mouth of the confining passage as they are deposited therein, in which retaining fingers are carried by bars mounted on the members forming the confining passage so as to slide in a horizontal plane, said bars being spring pressed to positions in which parts of said retaining fingers project into the confining passage above the strip last deposited therein, and cam means being provided for withdrawing said retaining fingers from the passage, against the spring pressure, at predetermined points in the cycle.

Referring to the numbered parts of the drawings, my improved machine has a framework including the end members 30 and 31, upstanding from a suitable base (not shown). Mounted on each of the end members, near the top thereof, is a housing 32 having a cover plate 33. The two end frame members are connected by two channel-shaped cross members 34, extending from the side members 30 to the side member 31, at each side of the machine, near the top thereof. The bases of these channel members constitute the top closures for the strip magazines, in which the separator strips B are stacked on edge. The end frame members 30 and 31 are also connected by the cross members 35, one at each side of the machine, the inner faces of said cross members being inclined so that they converge downwardly, as shown in section in Fig. 6.

The end frame members 30 and 31 are also connected by the transverse members 36, which are spaced apart to form the confining passage 37, in which the plaited structure C is received as it is formed. These members are provided with the horizontal ledges 38 (Fig. 7), strengthened by the buttressing ribs 39, and downturned flanges 40 are provided, at the ends of the members 36. Secured to the outer face of each of the end frame members 30 and 31, there is a casting 41 (Figs. 12, 29, 30) having a portion 42 projecting inwardly through an opening in the adjacent end frame member into contact with the outer faces of the flanges 40 on the members 36, which form the confining passage 37. Each of these portions 42 has an inwardly-opening guideway 43 formed therein and extending horizontally throughout the width of casting 41. Parallel to the guideway 43 and located on the center line of the confining passage 37, there is formed on the outer face of each casting 41 (Fig. 12) a machined surface 44, to which is attached a block 44a. Each casting 41 has formed therein, to the right and left of the machined surface 44 and extending into the guideway 43, the openings 45 adapted to permit longitudinal movement of the blocks 50, which are attached to the guide blocks 47, secured to flanges 40 by dowel pins 48 and screws 49, which guide blocks 47 fit slidably in the guideway 43 and support the members 36, permitting their movement toward or away from each other to adjust the width of the confining passage 37. The studs 52, extending through holes in the blocks 50, are screwed into the guide blocks 47, being firmly tightened therein by turning by a wrench applied to the octagonal sections 53. The outer ends 56 of the studs 52 extend through elongated slots 54 in the clamping plates 55, and are threaded to receive the nuts 57, whereby the parts may be clamped in adjusted position. Wear plates 58 may be secured to the inner faces of the end frame members 30 and 31, for engagement by the guide blocks 47. Two central adjusting screws 59 are provided, one at each end of the machine, and each has oppositethreaded ends 60 and 61 screwing into the lugs 51 of blocks 50. A central collar 62, keyed on screw 59 and provided with a plurality of holes 63 to receive a tool for turning the collar, engages a notch 64 formed in block 44a. The screwcollars 65, which lock the spacing sleeves 65a against collar 62, fix the latter against movement longitudinally of screw 59. The upper ends of clamping plates 55 bear on the lugs 55a formed on the casting 41, while the lower ends bear similarly on surfaces 67 suitably machined on the upper flanges of the housing 66. It will be seen that, by loosening the nuts 57 (Fig. 12) and rotating the adjusting screws 59 at each end of the machine, by means of the collars 62, the members 36 may be moved toward or away from each other, so as to narrow or widen the passage 37 as may be required for the manufacture of different fabrics having pile of different depths. When such adjustment has been effected, the nuts 57 are tightened on the threaded ends 56 of studs 52, thus clamping the members 36 in the adjusted positions.

Two main cam shafts 68 (Fig. 3), one at each side of the machine, are provided, by means of which the strip-transfer devices and the rocking warp guide are operated. There are also a pair of cam shafts 69, mounted on the top of the framework, one at each side of the machine, and since these shafts carry the cams for operating the strip-feed mechanism, they will be referred to as the strip-feed shafts. A pair of shafts 70 are also provided, one on either side of the machine, and, since these shafts carry the cams for withdrawing the retaining fingers from the mouth of the confining passage, these will be referred to as the finger-release shafts. Journaled in bearings 72 (Figs. 6 and 7) carried by housings 71 and 71b, mounted on the inside of the end frame member 31, is the power shaft 73, by which power is delivered for driving the various operating mechanisms of the machine. A pair of worms 74 are fast on the shaft 73, one on either side of the machine. A worm wheel 75 is fast on each of the shafts 68 (Figs. 5 and 6) adjacent the end frame member 31. Two bevel gears 76 are fastened to each shaft 68, one adjacent each of the end frame members, and each bevel gear 76 meshes with a bevel pinion 77 fast on the lower end of a vertical shaft 78. The shafts 68 are journaled in housings 71, 71a, 71b, and 71c mounted on the frame members 30 and 31. Vertical shafts 78 are journaled in bearings 79, mounted in the housings 71, 71a, 71b, and 71c, and the upper ends of said shafts 78 extend through openings 80, provided in the bases of the channel members 34, and are journaled in bearings 82 carried by the gear housings 81, which are mounted on said base members. A bevel pinion 83 is fast to the upper end of each of the four vertical shafts 78. The two strip-feed shafts 69 extend lengthwise of the channel-shaped members 34 and are journaled in bearings 84 (Fig. 5), carried by the gear housings 81, and brackets 85 (Figs. 2, 2A and 3) mounted on the bases of these channel members 34. Bevel gears 86, fast on the shafts 69, mesh with the bevel pinions 83, fast on the upper ends of the vertical shafts 78.

Two of the vertical shafts 78, on the same side of the longitudinal center line of the machine, have, within the housings 71 and 71a, a bevel gear 87 (Fig. 6), which is fixed to the shaft 78 and meshes with a bevel gear 88 on one end of a transverse shaft 90 and 90a. One end of each of these shafts is journaled in bearings 89, carried by the housings 71 and 71a, and the other ends of the shafts are journaled in bearings 91 carried by gear housings 92 and 92a, mounted on ledges 38 of members 36. A bevel pinion 93 is fixed to the end of the shaft 90 within the gear housing 92. As shown in Fig. 8, two transverse shafts 90 and 90a are provided, one at each end of the machine, and the housings 92 and 92a are each mounted on one of the ledges 38 of the members 36, but at opposite ends of the machine, so that transverse shaft 90 extends from a vertical shaft 78, at one side of the machine, across the end of the passageway 37 to a gear housing 92 on the other side of said passageway, while transverse shaft 90a extends from the shaft 78 in gear-box 71a to gear-box 92a immediately adjacent thereto without crossing the passageway 37. As indicated in Figs. 6 and 7, the shaft 90 may be formed of two sections having splined portions 95 fitting in an internally-splined sleeve 94, so that the two sections of the shaft are caused to turn together but are allowed movement longitudinally of the sleeve, to permit the adjustment of members 36, forming the confining passage 37, toward and from each other. The shaft 90a is similarly provided with a splined end 95a adapted to slide within an internally splined socket supported in the bearing 91 of the gear-box 92a. The finger-release shafts 70 (Figs. 5, 7 and 8) are journaled at one end in a bearing 98, carried by the gear housings 92 and 92a, at the other end in the supporting brackets 96, and, intermediate these, in the supporting brackets 97. The gear housings 92 and 92a, the intermediate brackets 97, and the supporting brackets 96 are all mounted on the ledges 38 of the members 36.

The warp of yarns A (Fig. 1) is led from a suitable source of supply (not shown) over a guide roller 102, the trunnions 101 of which are journaled in brackets 100, mounted on top of the end frame members 30 and 31, and so located that, as the warp of yarns leaves roller 102 it is approximately in the vertical plane of the mouth of the confining passage 37.

From the roller 102, the warp of yarns A passes downwardly through a warp guide, which extends practically from end to end of the machine and is so mounted that it may be oscillated, to carry its lower end back and forth over the mouth of the confining passage 37, for the purpose of laying the warp of yarns over said mouth, first in one direction and then in the other. This warp guide (Figs. 3, 4, 13, 14, 15 and 16) comprises end castings 103, having the outline shown in Fig. 14, which consists of an upwardly projecting arm 103a and a lower V-shaped portion 104. To the flanges 104a of the lower portion are secured the side plates 106, the upper portions thereof being parallel as shown at 107, while the lower portions converge toward each other. To the lower edges of the side plates 106 there are secured the spaced parallel strips 108, which form the side walls of the reed. These strips 108 are connected by the reed dents 110 and 109, and it will be noted (Fig. 13) that the upper set of dents, 110, is staggered with respect to the lower set 109. Each individual yarn of the warp A passes downwardly between one of the dents 110 and its adjacent dent 109, so that these dents keep the yarns of the warp properly spaced with respect to each other, and constitute what is known in the weaving art as a reed. A pair of spaced parallel rods 111 is secured along the lower edges of the strips 108, and the yarns of warp A pass out of the warp guide through the reed and between the rods 111, first one and then the other of said rods acting on the warp to lay it, first in one direction and then in the other, across the mouth of the confining passage.

Each end plate 103 of the warp guide is provided with a vertical rib 112, received in a keyway 114 of a member 113, to which may be secured the corresponding endplate 103 by means of three cap-screws 105 (Fig. 14). The upper cap-screw 105 screws into that end of the flanged stud 115 which passes through a closely fitted hole in the upper end of the member 113. The stud 115 has an enlarged portion 116, on which is a ball-bearing 117, which is mounted in a recess in a block 118, provided with a cover plate 119. Thus, the stud 115 may rotate in the block 118. The edges of the block 118 are slidably mounted in the grooves 120 of the guide members 121, which are fastened by the cap-screws 122 to the upstanding legs of a pair of angle brackets 123, mounted on and secured to a bracket 124, which extends inwardly of the machine from the corresponding end member, 30 or 31. A bracket 125 is secured to the end frame member, 30 or 31, and a shaft 126 is journaled in bearings 127, carried by the bracket 125, and in a bearing 128, carried by a downwardly extending lug 129 of bracket 124. An eccentric crank-disc 130 keyed and pinned to the inner end of shaft 126 carries an eccentrically-mounted bearing housing 131 secured thereto by cap-screws 132. A ball bearing 133 locked in the housing 131 forms a center for the wrist-pin 134, which is fixed by a nut 134a in the lower end of the member 113, fastened to the end plate 103 of the warp guide. The members 113 are thus permanently-mounted parts of the warp-guide-oscillating mechanism, to which may be attached, or from which may be detached, a warp-guide, by insertion, or withdrawal, as the case may be, of three cap-screws at each end. This arrangement permits the ready substitution for a warp-guide in service of a warp-guide containing a warp previously "drawn in" externally of the machine, thus minimizing the considerable delay otherwise associated with a change of warps.

As the shaft 126 is oscillated through a half revolution, first in one direction then the other, the wrist pin 134 will be carried from the position shown in Fig. 4 to a position diametrically opposite, and then returned to the first position, and this causes the throat of the warp guide containing the dents of the reed to describe an approximately semicircular path over the mouth of the confining passage, from the position shown in Fig. 4 to the position shown in dotted lines in that figure, and then back again. During such movement, the block 118 slides vertically in the guides 121.

The cam shaft 68, shown at the right in Fig. 3, has, at each end thereof, outside of the end frame member, an eccentric wrist pin 135, to which is pivotally connected the lower end of a pitman 136 (Fig. 3). The upper end of pitman 136 is pivotally connected, at 137, to one arm of a bell crank 138, journaled on the shaft 139, which is carried by the end frame members 30 and 31. The other arm of this bell crank is pivotally connected, at 140, to one end of a link 141, the other end of which is pivotally connected, at 142, to one end of a rack bar 143. This rack bar has rack teeth 145, which mesh with a pinion 144 fast on the shaft 126 (Figs. 13 and 17). It is understood that there are two of these sets of driving connections, one at each end of the machine. A cup-shaped member 147 (Fig. 17) is mounted on the bracket 125 and extends through an opening 146 therein. The portion of the rack bar 143 having the rack teeth 145 thereon is T-shaped, as shown in Fig. 13, and engages the bottom of the cup-shaped member 147. The latter has secured thereto a pair of spaced, parallel, flanged guides 148, which engage under the flanges 149 of the rack bar, so as to guide it in its rectilinear movement. It will be apparent that, as the cam shaft 68 revolves, the two bell cranks 138 (Fig. 3) will be rocked, first, counterclockwise, and, then, clockwise, thus moving the rack bars 143, first, to the left and, then, back to the right to the position shown in Fig. 3. This causes the shaft 126 to make a half revolution, first, in one direction and, then, in the other, which oscillates the warp guide back and forth over the mouth of the confining passage.

The severable separators strips B are carried in two strip magazines, one at each side of the machine, from which the strips are fed, one by one, as needed, by strip-feed devices which cooperate with strip-transfer devices that deposit the individual strips, one by one, on the warp A in the mouth of the confining passage 37. Each magazine includes a base plate 150 (Figs. 3, 4 and 18), on which the strips B are stacked on edge. The channel members 34 may constitute a part of the top of the magazine.

The means provided for feeding the supply of strips toward the point of discharge from the magazine are not shown herein, but may be substantially as shown in my U. S. Patent, No. 2,302,722, granted November 24, 1942.

Slidably mounted on the face of the leg of the channel member 34 that is next the center of the machine, are a plurality of feed slides 152 (Figs. 2, 2A, 3, 4, 5, 18, 19 and 20). Each feed slide 152 has a thickened rib 153, at each end thereof, and a thickened portion 154 extending across the bottom thereof. This thickened portion extends, at each end, beyond the ribs 153, to form the lugs 155. A bar 156 is secured in a downwardly-opening recess in the lower thickened portion 154 of the feed slide, said bar being somewhat shorter than the portion 154, as indicated in Fig. 20. Each bar 156 is provided, in its face adjacent the supply of strips, with a recess 157, corresponding in width and depth to the width and thickness of a single separator strip B. T- or L-shaped guides 158 and 160 (Figs. 2 and 2A), bolted to the corresponding channel member 34, have laterally extending flanges 159 and 161, which overhang the ends of the slides 152, and said guides are provided with downwardly extending fingers 162 (Fig. 3), which engage the lug portions 155 of the feed-slides. In this way, the several feed-slides 152 are mounted on the channel member 34, so as to slide vertically from a position in which the recess 157 is in line with the foremost strip B in the magazine, to the position shown at the left, in Fig. 3, and to return to the first or strip-receiving position.

Each of the feed-slides 152 is provided with a pair of ears 163 (Figs. 3, 4, 5 and 18), to which the lower ends of a pair of links 164 are pivotally connected. The upper ends of links 164 are pivotally connected to arms 165, which are fast on a stub shaft 166, journaled in brackets 167 carried by the corresponding channel member 34. An arm 168 is fast on each of said stub shafts, between the two arms 165, and an adjustable link 169 has one end thereof pivotally connected to the arm 168, while the other end thereof is pivotally connected, at 170, to the upper end of a rock arm 171, journaled at 172 in a bracket 173 fast on the base of the channel member 34. Each rock arm 171 carries a roller 174 making edge contact with a cam 175, fast on the shaft 69. Referring to Fig. 3, it will be apparent that, with the parts in the position shown at the left of Fig. 3, the revolution of shaft 69 through 90° will rock arms 171 and stub shafts 166 counterclockwise, thus raising the slides 152, from the position shown at the left of Fig. 3, to the position shown at the right of that view. As the shaft 69 continues to turn, during the next 180° of its revolution, the cams will hold the slides in the upper position, and, during the last 90° of the cycle, the cams will assume positions permitting rock arms 171 and stub shafts 166 to rock clockwise, thus lowering the feed slides 152, from the position shown at the right of Fig. 3 to the position shown at the left of that view. Each of the rock-arms 171 is provided at its upper end with a machined slot 171a, whose outer end is closed by a plate 171b through which is tapped centrally an adjusting-screw 171c. An H-shaped block 171d, slidable in the slot 171a, is adjustably located therein by the adjusting-screw 171c in co-operation with a spacing-block 171e inserted beneath the block 171d and bearing on the bottom of the slot 171a.

By varying the position of the pivot 170 by the means just described, and by adjustment of the length of the link 169 the amplitude of movement of the feed-slides 152 and their end points may be adjusted to accommodate strip of different widths.

In the vertical face of recess 157 of bar 156, approximately midway of the height thereof, there is provided a series of cup-shaped recesses 176 (Figs. 18, 19 and 20), each of which is connected by a short transverse passage 177 with a longitudinal passage 178 in said bar, the ends of said passage being closed by suitable plugs. Midway of its ends, the passage 178 is connected by a short inclined passage 179 in bar 156, and a transverse passage 180 in portion 154 of the feed-slide, with a vertical passage 181. A hose-stem 182 is screwed into the upper end of passage 181 and a flexible hose 183 is attached to the upper end of this stem. The several hose connections 183 lead to a suitable timed valve mechanism (not shown), by means of which the hose connections 183 may be connected with a source of reduced pressure or with atmosphere, at the proper times in the cycle of operation. This mechanism may be of the character shown in my U. S. patent, No. 2,302,722, and illustrated in Figs. 13, 14 and 15 thereof. The control of the application of suction, or atmospheric pressure, to these connections will be such that, when feed-slide 152 rises until recess 157 is opposite the foremost strip B in the magazine, suction will be applied which will hold the foremost strip in the recess 157. This suction will be maintained during the downward movement of the slide 152 and until the strip is to be delivered to the upper transfer devices, at which time the suction will be cut off and the hose connections 183 connected to atmospheric pressure, which will be maintained during the upward movement of feed-slides 152.

The two strip-feeding mechanisms, one cooperating with each of the two strip magazines, alternately deliver strips to two strip-transferring mechanisms, one arranged on either side of the central vertical plane of the confining passage. Each strip-transferring mechanism comprises upper transfer devices and lower transfer devices, the former receiving a strip from the corresponding strip-feed slides and transferring said strip to the corresponding lower devices, which transfer the strip to and deposit it in the mouth of the confining passage.

Referring to Figs. 2, 2A, 3, 4, 5, 21, 22 and 23, the upper transfer devices are mounted on two parallel shafts 184, one on either side of the central vertical plane of the confining passage. Shafts 184 are journaled in the end frame members 30 and 31, and in supporting brackets 185, which, as shown in Fig. 6, may be mounted on the inclined cross members 35. Sleeves 186 (Fig. 21) each provided with a pair of arms 187 are fastened to shafts 184 by keys 188. An upper transfer bar 189 is fastened to each pair of arms 187, by cap-screws 190, and an exposed face of each bar 189 is provided with a recess 191, of the width and depth of a single separator strip B.

Referring to Figs. 2, 2A, 3 and 5, pinions 192 are fixed to each end of each shaft 184, within the housings 32, and each pinion 192 meshes with a segmental rack 193, on one arm 194 of a bell crank journaled on shaft 139. The other arm 195 of the bell crank is pivotally connected to the upper end of an adjustable link 196, the lower end of which is pivotally connected, at 197, to a rocker arm 198, pivoted at 199 in a bracket on the frame. Each rocker arm 198 carries a roller stud 200, working in the cam groove 201 of the double box cam 202.

Referring to the left-hand portion of Fig. 3 and the timing diagram (Fig. 28), it will be noted that a dwell of approximately 120° is provided in the lower portion of the cam groove 201, with the result that the upper left-hand transfer device remains motionless in the strip-receiving position shown for approximately the first 60° of revolution of shaft 68, in order to afford sufficient time for the left-hand feed-slides 152 to retreat upwardly out of the range of movement of the upper transfer device, having delivered a strip B thereto. The next 115° of rotation of the left-hand cam 202 results in a clockwise rotation of the left-hand shaft 184, and a corresponding movement of the left-hand upper transfer device from the strip-receiving position to the strip-delivering position, corresponding to the position of the right-hand upper transfer device shown at the right in Fig. 3.

At this point a dwell of 10° is provided in the cam groove 201, so that the left-hand upper transfer device remains stationary in the strip delivering position from 175° to 185°, affording time for the release of suction from the face of the upper transfer bars 189 bearing the strip B, and its application to the adjacent faces of corresponding bars of a lower transfer device, as will be described later, thereby affecting delivery of the strip B from the upper to the lower transfer device. There is a fall in the cam groove 201 from 185° to 300°, so that during the next 115° of revolution of shaft 68, shaft 184 is rotated in a counter-clockwise direction, returning the left-hand upper transfer device to the strip-receiving position shown. Due to the dwell in cam groove 201, the upper transfer device is stationary in the strip-receiving position during the last 60° of revolution of shaft 68, while the corresponding feed-slides 152 descend from their strip-receiving position, shown at the right of Fig. 3, to their strip-delivering position, shown at the left of said view, to effect transfer of a strip B to the transfer bars 189 of the left-hand upper transfer device. It will be noted that the cam grooves 201, of the cams at the right of Fig. 3, are such that the timing of the right-hand upper transfer device is 180° displaced from that of the left hand device.

Referring to Figs. 21, 22 and 23, a plurality of cup-shaped recesses 203 is formed in the faces of recesses 191 of bars 189. These cup-shaped recesses are connected by transverse passages 204 to a passage 205, which extends longitudinally of bar 189. This longitudinal passage is connected by the inclined passages 206, in the bar, to inclined passages 207 in the arms 187, which passages 207 communicate with passages 208. The passage 208 in each arm 187 is connected by a transverse passage 209, and a radial passage 210 in shaft 184, with the passage 211, which extends longitudinally of shaft 184 and terminates in stuffing boxes, one of which is shown in the sectional view, Fig. 27.

Referring to Fig. 27, the outer end of each upper transfer shaft 184 is supported in a ball-bearing 280a, fitting in a recess 280 in the cover plate 33. Each plate 33 is provided with circular bosses 281 concentric with shafts 184 (and also circular bosses concentric with the lower transfer shafts 213, since the same stuffing box construction is used for upper and lower transfer shafts). The hollow, cylindrical member 282 is held concentric with shaft 184 by the rabbit 283 formed thereon, which fits recess 280 in the cover plate. Packing material 284 surrounds the projecting end of shaft 184 filling the bore of member 282, in which it is retained, and compressed as necessary, by the flanged follower 285, which may be drawn tight by cap-screws 286, tapped into member 282. A cup-shaped cover 287, centered on the member 282 by means of the rabbit 288, is held tightly thereon by cap-screws 289, which are tapped into the cover plate 33 and serve to mount the stuffing box or gland structure thereon. A pipe 212 is screwed into a boss in the center of the cover 287. These pipes 212 are connected to suitable control mechanism, such as shown in my U. S. Patent No. 2,302,722, whereby the passages 211 may be connected with a source of reduced pressure or with atmospheric pressure, at appropriate times in the cycle of operation. When these passages 211 are connected with a source of reduced pressure, suction will be applied, at the cup-shaped recesses 203, to the strip B to hold it in recesses 191, and, when the passages 211 are connected with atmospheric pressure, the strip will be released. The control over the application of suction, and its release, will be such that suction will be applied, at the recesses 203, at the instant that suction is cut off from the recesses 176 of the corresponding feed slides, so that the strip will be released by the feed slides and gripped by the bars 189 of the upper transfer devices. Suction will be maintained at the recesses 203, while the arms 187 and bars 189 are swung to the lower position to deliver the strip to the lower transfer devices, and the suction will be released at the instant the strip is to be delivered to the lower transfer devices. The recesses 203 will be at atmospheric pressure during the return of the upper transfer devices to the strip-receiving position, shown at the left-hand side in Fig. 3.

Referring to Figs. 2, 2A, 3, 4, 5, 24, 25 and 26, the two parallel shafts 213, one on either side of the central vertical plane of the confining passage, extend from end to end of the machine and are journaled in the end frame members 30 and 31, the cover plates 33 of housings 32, and the brackets 185. A plurality of sleeves 214 are keyed to the shafts 213 by keys 215, and each of these sleeves has a pair of laterally extending arms 216, each having a seat 217 at the outer end thereof. A lower transfer bar 218 is secured in the seats 217 of each pair of arms on a single sleeve 214, by means of the cap-screws 219. A plurality of transverse slots 220 are formed in the face of each bar 218, to receive ends 255 of retaining fingers 253, when the bars are at strip-depositing position.

On each end of each shaft 213, within the housing 32, pinions 221 are fastened, which mesh with the segmental racks 222 (Fig. 3), on the outer ends of arms 223 of levers journaled on the shaft 139, the other arms 224 of said levers being pivotally connected to the upper ends of links 225, the lower ends of which links are pivotally connected, at 226, to the ends of rocker arms 227, pivoted in brackets on the frame, at 199. Each rocker arm 227 carries a roller stud 228, which engages in the cam groove 229 of the adjacent double box cam 202, fast on shaft 68.

Figure 28:
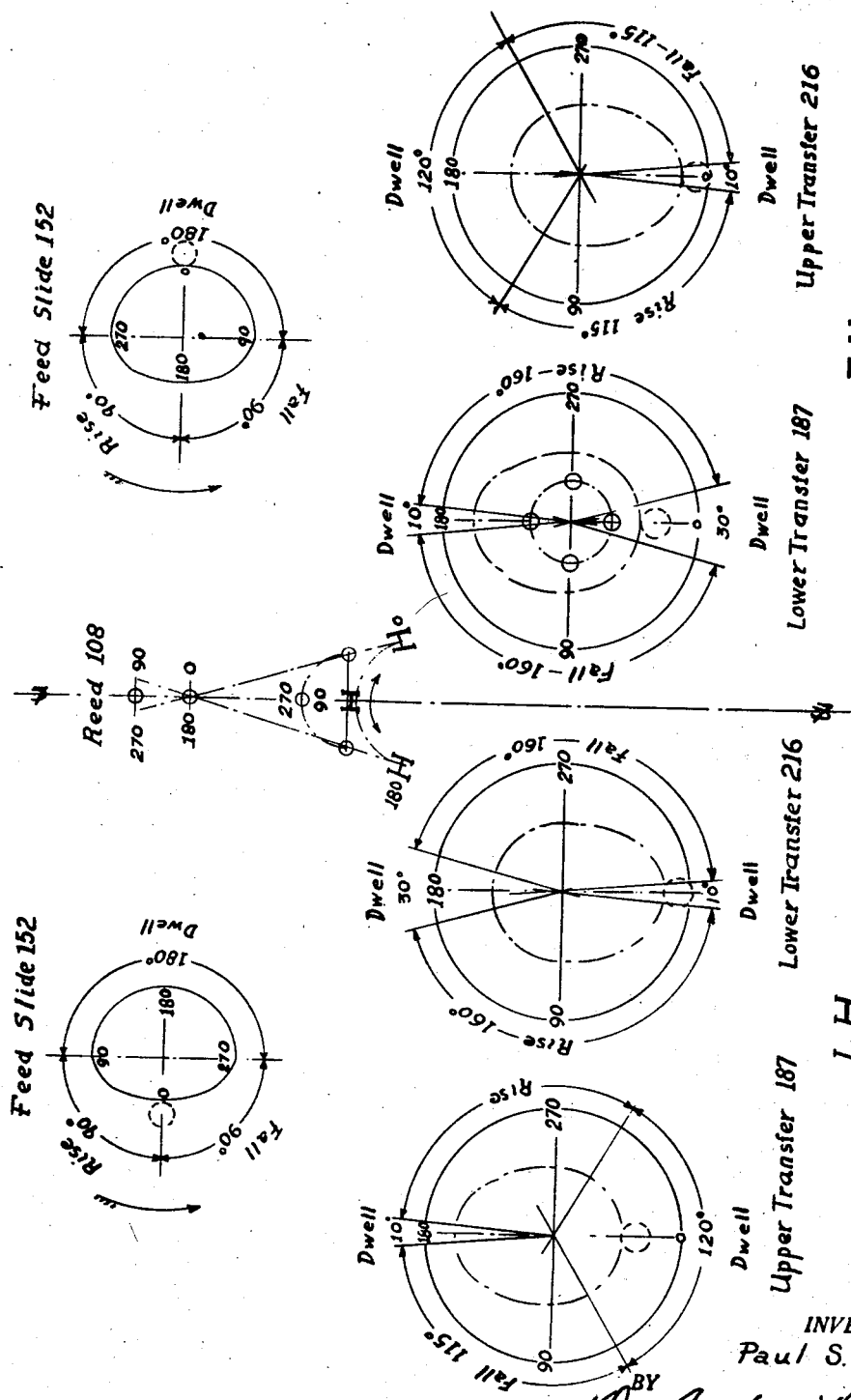
Fig. 28 is a timing diagram, showing the timing of the feed-slides, upper and lower transfer devices and warp guide.

Referring to the left-hand part of Fig. 3 and the timing diagram, Fig. 28, it will be noted that a dwell of 10° is provided in the cam grooves 229 of the cams 202, the follower 228, at the left of Fig. 3, being shown in engagement with this dwell. Accordingly, during the first 5° of the revolution of shaft 68, the left-hand lower transfer shaft 213 remains stationary, maintaining the left-hand lower transfer bars 218 within the mouth of the confining passage 37, that is to say, in strip-depositing position. During the next 160° of the revolution of shaft 68, that is, from 5° to 165°, the shape of the cam grooves 229 is such that the left-hand lower transfer shaft 213 is rocked counter-clockwise, causing the left-hand lower transfer device to move from the strip-depositing position shown to its strip-receiving position, corresponding to that shown at the right of the view.

At this point, a dwell of 30° in the cam grooves holds the left-hand lower transfer shaft stationary from 165° to 195° of the revolution of shaft 68. This affords time for the application of suction to the lower transfer bars 218 and its simultaneous release from the adjacent upper transfer bars 189, thus effecting delivery of the strip B borne by the latter, and also to permit a slight movement of withdrawal by the upper transfer device to avoid interference with the ensuing movement of the lower transfer device.

The shape of cam grooves 229 is such that, from 195° to 355° of the revolution of shaft 68, the left-hand lower transfer shaft 213 will be rocked clockwise causing the left-hand lower transfer device to move from strip-receiving position to its strip-depositing position, in which it is shown in Fig. 3. In so doing, the strip B, carried by bars 218 of the left-hand lower transfer device, is placed upon the warp of yarns, A, extending from the left-hand edge of the previously deposited strip across the mouth of passage 37 to the throat 111 of the warp guide. The final stage of the movement of bars 218 presses the strip B about to be deposited below the level of the undersurfaces of projections 255 of retaining fingers 253 (Fig. 10), which have been retracted, in the meantime, as will be described later. Due to the 10° dwell previously mentioned, the left-hand lower transfer shaft 213 will remain stationary during the next 10° of the revolution of shaft 68 (355° to 5°), with bars 218 in strip-depositing position, allowing time for the release of suction from the faces of bars 218, and for the return of fingers 253 to retaining position above the deposited strip.

It is to be noted that the feed-slide actuating cams 175 and the transfer device actuating double box cams 202, on the right side of Fig. 3, are 180° out of phase with the corresponding cams on the left-side.

Referring to Figs. 24, 25 and 26, the face of each bar 218 has a plurality of cup-shaped recesses 230 formed therein, each of which recesses is connected by a transverse passage 231 to a passage 232 extending longitudinally of the bar 218. This longitudinal passage 232 is connected by the transverse passages 233 in the bar, and 234 in the arms 216, with passages 235 extending longitudinally of the arms 216. These passages 235 communicate through transverse passages 236, and radial passages 237 formed in shaft 213, with the passage 238, which extends longitudinally of shaft 213, and terminates in stuffing boxes or glands, such as those described in connection with shafts 184 and shown in Fig. 27. From these glands extend pipes 239, which are connected to suitable means for controlling the application of reduced pressure or atmospheric pressure to the passages 238, such as the mechanism shown in Figs. 13, 14 and 15 of my U. S. Patent No. 2,302,722. Timing of the control will be such that suction is applied at the recesses 230, at the instant suction is cut off from the recesses 203 of the upper transfer devices on the same side of the machine, so that the upper transfer devices will release the strip and the suction will hold it against the faces of bars 218 of the lower transfer devices. Suction will be maintained at the recesses 230, while the lower transfer devices move from the strip-receiving position to the strip-depositing position, and the suction will be released at the recesses 230, at the instant that the arms 216 start their return movement, so that they will leave the strip in the mouth of the confining passage 37.

As shown in my U. S. Patent, No. 2,302,722, the mouth of the confining passage is formed by a pair of parallel plates 240 and 241, which are seated and fastened in recesses 242, formed in the upper portions of the members 36. The adjacent faces of members 36 are provided with a plurality of parallel, vertical ribs 243, and plates 240 and 241 are provided with the vertical ribs 244 in line with the ribs 243. The ribs 244 are extended laterally, at 245, over the upper edges of the plates 240 and 241 (Figs. 4, 4A and 10). The spacing between the edges of the ribs 243 and 244 is substantially the same as the width of the severable separator strips B, as shown in Fig. 4A, so that the bights of the yarns of warp A, as they are folded about the separator strips, are received in the grooves between adjacent ribs. It will be seen that, as the warp A is plaited about the successive strips B deposited in the mouth of the confining passage, a plaited structure C is formed, which feeds downwardly in said confining passage.

Mounted on the upper end of each of the members 36 (Figs. 8, 9, 10 and 11) and extending parallel to the confining passage, adjacent the mouth thereof, are a plurality of retaining finger bars 246. Each bar 246 has secured to each end thereof, by capscrews 248, a dovetail guide 247, which is slidable in a dovetail guideway 249, formed in the upper end of a bracket 250, secured to member 36 by screws 251. These screws also hold in place a leaf spring 252, the free end of which bears against the outer end of the corresponding guide 247, and these leaf springs 252 tend to move the retaining finger bars 246 toward the confining passage. The bars 246 carry a plurality of retaining fingers 253, having projections 254 which work in notches 256 formed in the upper ends of the plates 240 and 241, and projections 255, which normally extend into the confining passage. The fingers 253 are formed in U-shaped pairs having a connecting base section 257, which seats on the upper surface of bar 246, and is secured thereto by a clamping plate 258 and screws 259.

Each bar 246 has two pairs of laterally-projecting arms 260, to which the cross bars 261 are fastened, forming laterally-extending yokes. Rock shafts 263 are journaled in brackets 262, fastened to the members 36, and arms 264 are keyed to each of these rock shafts and extend upwardly between the bars 261 and the top of the corresponding member 36. The convex head 265 of a bolt 266, carried by the upper end of each arm 264, engages the adjacent cross bar 261, as shown in Fig. 8. Between the brackets 262, a downwardly extending rock arm 267 is provided, which is keyed to shaft 263 and carries, at its lower end, a roller 268 engaging the periphery of a cam 270 having the lobe 269, said cam 270 being fast on the shaft 70, previously referred to.

It will be seen that the springs 252 normally hold the bars 246 in their inner positions, in which the retaining finger projections 255 project into the confining passage from each side thereof. As the shafts 70 revolve, and the lobes 269 on cams 270 engage the rollers 268, arms 267 and 264 will be rocked so as to move the bars 246 away from the plates 240 and 241, against the pressure of springs 252, to withdraw the retaining finger projections 255 from the confining passage and, as soon as the lobes 269 have passed the rollers 268, the springs 252 will again move said finger projections into the confining passage. Cams 270 are so timed that, as a set of lower transfer arms 216 are about to deposit a separator strip B in the mouth of the confining passage, upon the warp of yarn A, lobes 269 act on rollers 268 to move the bars 246 away from the confining passage, thus withdrawing the finger projections 255 so that the separator strip may enter the mouth of the passage. The movement of lobes 269 past the rollers 268 permits the springs 252 to move the finger projections 255 above the strip B last deposited, and the retaining fingers 253 therefore retain said strip in the passage, while the arms 216 return to strip-receiving position and the warp guide lays the warp over the strip so deposited. It will be obvious that the gear connections to shaft 70 are such that cams 270 make two revolutions for each cycle of the machine, that is to say, for each single revolution of shafts 68 and 69.

Referring to Fig. 1, the lower ends of the members 36 forming the confining passage are cut away at 271, to accommodate the rubberizing rollers 272, which engage the plaited structure C as it emerges from the lower end of the confining passage, to apply rubber cement to opposite faces thereof. These rubberizing rollers correspond to the rollers 334 of my U. S. patent, No. 2,302,722. They are carried by end frames 273, that are adjustable toward and from each other, to provide for plaited structures of varying thickness, by means of interconnected adjusting rods 274, located at opposite ends of the machine and having oppositely threaded portions 275 and 276 in screw-threaded engagement with brackets 277 and 278. The parts of the mechanism, acting on the plaited structure C after it leaves these rubberizing rollers, may be the same as shown in my said Patent No. 2,302,722.

The operation of my improved apparatus for making cemented pile fabric should be quite apparent from the foregoing description, but will be set forth briefly here.

Referring to the left side of Fig. 3, and the timing diagram (Fig. 28), the drawing represents the positions of the parts at the beginning of a cycle, that is to say, 0°. At this point, suction will be applied to the rescesses 203 in the faces of the left-hand upper transfer bars 189 and will be released simultaneously from the recesses 157 in the faces of the left-hand feed-slide bars 156, causing the strip B between these bars to be held firmly in the recesses 191 in the faces of the left-hand upper transfer bars 189. At the same time, suction will be released from the recesses 230 in the faces of the left-hand lower transfer bars 218, completing the deposition of a strip B in the mouth of the confining passage 37. Rotation of the left-hand feed-slide actuating cams 175, during the portion of the cycle from 0° to 90°, from the position shown, causes the left-hand feed-slides 152 to rise from their strip-delivering position, as shown, to their strip-receiving position, in which the recesses 157 in the faces of the left-hand feed bars 156 are in line with the supply of strips in the left-hand magazine. Meanwhile, during the portion of the cycle from 5° to 165°, the cam grooves 229 of the left-hand box cams 202 cause a counter-clockwise rotation of the left-hand lower transfer shaft 213, causing the left-hand lower transfer bars 218 to describe an upward path in a circular arc toward their terminal strip-receiving position, which they will reach at 165° of the cycle. Meanwhile, a dwell in the cam grooves 201 of the left-hand box cams 202 holds the left-hand upper transfer bars 189, bearing a strip B, stationary, from 0° to 60° of the cycle, until the lower surfaces of the bars 156 of the rising left-hand feed-slides 152 are clear of the upper surfaces of the left-hand upper transfer bars 189, when, from 60° to 175° of the cycle, the cam grooves 201 cause a clockwise rotation of the left-hand upper transfer shaft 184, causing the bars 189 to describe a downward path in a circular arc to their terminal strip-delivering positions, which they will reach at 175° of the cycle. Due to a 10° dwell in the cams 201, and a 30° dwell in the cams 229, the left-hand upper transfer bars 189 will remain stationary from 175° to 185° of the cycle, and the left-hand lower transfer bars 218 will remain stationary from 165° to 195° of the cycle, the strip B, borne by the upper left-hand transfer devices being between the transfer bars 189 and 218. As the bars dwell momentarily in this position, suction is released from the recesses in the faces of the bars 189 and applied to the recesses in the faces of bars 218, causing the strip to adhere to the latter.

Meanwhile, at the begining of the cycle, the crank pins 135, attached to the ends of the right-hand cam shaft 68, begin to rise from lower dead center, raising the pitmans 136, rocking the bell cranks 138, moving the racks 143 to the left, thereby causing counter-clockwise rotation of the pinion shafts 126, and upward movement of the wrist pins 134 and, with them, the warp guides. Because of the fact that the crank pins 135 begin the cycle at lower vertical dead center, while the wrist pins 134 are at right-hand horizontal dead center, the warp guide moves at first relatively slowly and chiefly upward along a line substantially coincident with its vertical axis and, accordingly, it is not until the bars 218 of the left-hand lower transfer device, which, concurrently, are describing an upward movement toward their strip-receiving position, as previously described, are out of range, that the lower portion of the warp guide begins the motion of translation to the left across the mouth of the confining passage 37.

It may be noted here that this combination of harmonic actuating motions is particularly adapted to the requirements of this system, in that it provides a plaiting movement of extreme compactness between closely spaced cooperative parts and, also, because of its two-fold harmonic character, enables the use of a warp guide structure of great lightness, in spite of its relatively small section and great unsupported length, without the sacrifice of essential rigidity.

At 90° of the cycle, the warp guide will cross the center of the confining passage 37 from right to left and, continuing its movement, will draw the warp, from the right-hand edge of the strip previously deposited, across the mouth of the passage, preparatory to the deposition of a strip by the right-hand lower transfer devices. The warp guide will, at 180° of the cycle, attain a left-hand position exactly analogous to its right-hand position, which it occupied at 0° of the cycle, as shown in Fig. 3. Further rotation of the cam shaft 68, beyond 180° of the cycle, will cause the warp guide to commence, from left to right, an excursion exactly analogous to that just described, preparatory to the deposition in the mouth of the confining passage 37 of the strip now held, at mid cycle, on the faces of the bars 218 of the left-hand lower transfer devices, as will now be described.

From 185° to 300° of the cycle, the grooves 201 of the left-hand cams 202 cause the left-hand upper transfer device to move outwardly and upwardly in an arc from its strip-delivering position to its strip-receiving position, which it will reach at 300° of the cycle. In the meantime, at 180° of the cycle, suction will have been applied to the recesses 176 of the feed bars 156 of the left-hand feed slide 152, causing the outermost strip in the magazine to be firmly lodged in the recesses of said bars. This suction will continue during the ensuing 180° of the cycle. From 195° to 355° of the cycle, the grooves 229 of the left-hand cams 202 will cause the left-hand lower transfer devices to describe an outward and downward movement in an arc from strip-receiving position to strip-depositing position, bearing on the faces of the bars 218 the suction-retained strip B just received from the left-hand upper transfer devices. Concurrently, the warp guide will be moving upward from its lowest left-hand position, reached at 180° of the cycle, avoiding interference with the descending left-hand lower transfer devices, and will, at 270° of the cycle, have reached a position centrally above the mouth of the confining passage. At this point, the left-hand feed slide cams 171 will have completed their 180° dwell and, from 270° to 360° of the cycle will cause the left-hand feed slides to descend, bearing in the recesses 157 of the bars 156 the suction-retained strip B, just withdrawn from the left-hand magazine. At 300° of the cycle, the left-hand upper transfer devices will have attained strip-receiving position, as shown at the left of the figure, in which they will remain stationary for the next 120° of revolution of cam shaft 68, while the descending left-hand feed slides complete their downward movement to strip-delivering position, deliver a strip and thus complete their cycle. Meanwhile, the warp guide will have continued its movement from left to right toward the position shown at the right of Fig. 3, extending the warp from the left-hand edge of the strip last deposited across the mouth of the confining passage, while the left-hand lower transfer devices, at 355° of the cycle, will press upon the warp the strip which they carry, depressing both warp and strip below the level of the projections 255 of retaining fingers 253, and hold them during a dwell of 10°, while the fingers, momentarily retracted to permit the entrance of the strip, return to retaining position above the strip. At the same time, suction, is withdrawn from the bars 218, completing the cycle, with the left-hand parts of the warp guide occupying again the position shown in Fig. 3.

It is considered unnecessary to describe in detail the analogous operation of the precisely similar parts shown at the right of Fig. 3, which follow, commencing at 180° of the cycle just described with respect to the left-hand parts, an identical cycle.

Because of this fact, and the further fact that, at any point in the mechanism where suction is required, it is required during 180° of the cycle and is released during the remaining 180°, the valve arrangement for controlling the application and release of the suction may be greatly simplified. An examination of Fig. 3 will show that, at the beginning of a cycle, the lower right-hand transfer devices are receiving a strip from the right-hand upper transfer devices, the right-hand feed slides are withdrawing a strip from the right-hand magazine, and the left-hand upper transfer devices are receiving a strip from the left-hand feed slides. These three strips must be retained by suction during the ensuing 180° of the cycle, at the end of which period suction must be released to release the strip, and will not be required again until 180° later in the cycle. Similarly, at the beginning of a cycle, as shown at the left in Fig. 3, the left-hand lower transfer devices are depositing a strip in the confining passage, the left-hand feed slides are delivering a strip to the left-hand upper transfer devices, and the right-hand upper transfer devices are delivering a strip to the right-hand lower transfer devices, these three function requiring that suction be released from the corresponding surfaces, not to be restored until 180° later in the cycle, when these surfaces will again be in positions to receive and retain strips. Accordingly, only two valves are required, driven 180° out of phase with each other, each adapted to apply suction during one half of the cycle and to release it during the other half, and connected suitably, one to the left-hand lower transfer devices, the left-hand feed slides and the right-hand upper transfer devices, and the other similarly to the right-hand lower transfer devices, the right-hand feed slides and the left-hand upper transfer devices, both valves being connected to a vacuum pump or source of reduced pressure and to the atmosphere.

Connections to the feed slides are made by means of a plurality of flexible tubes 183 applied to the hose stems 182 (Fig. 18) and terminating in a fixed header connected to the valves. To make connections to the transfer devices, it is preferred to extend the outer ends of the hollow upper and lower transfer shafts 184 and 213 through the cover plate 33 (Fig. 5) and into stuffing boxes or glands (Fig. 27), four of these being mounted at each end of the machine on the centers of the respective shafts as shown in Fig. 1.

It will be evident that, at each cycle of the machine, a severable separator strip B, from each of the two magazines, is deposited in the mouth of the confining passage and that the warp of yarns A is laid, first in one direction and, then, in the other, across the strips B successively deposited in the mouth of said passage, thus forming the plaited structure C, which feeds downwardly in the confining passage as it is formed, being carried past the rubberizing rollers 272 which apply latex or rubber cement to the opposite faces of said plaited structure.

I am aware that the machine for making cemented pile fabric shown herein is susceptible of considerable modification and variation, without departing from the spirit of my invention, and, therefore, I have claimed my invention broadly, as indicated by the appended claims.

Having thus described my invention, what I claim as new and useful and desire to secure by Letters Patent, is:

1. In a machine for making cemented pile fabric in which a warp is passed to and fro to the mouth of a confining passage for being plaited over severable separator strips for forming a plaited structure, the combination of a strip magazine; an upper transfer device, movable between a strip-receiving position and a strip-delivering position; means for moving said upper transfer device between said positions; means for feeding strips, one by one, from said magazine to said upper transfer device in strip-receiving position; a lower transfer device, movable between a strip-receiving position, in which it makes contact with a strip carried by the upper transfer device in strip-delivering position, and the mouth of said passage; and means for moving said lower transfer device between said strip-receiving position and the mouth of said passage, to deposit severable separator strips, one by one, therein, as said warp is plaited about the strips so deposited.

2. In a machine for making cemented pile fabric in which a warp is passed to and fro to the mouth of a confining passage for being plaited over severable separator strips for forming a plaited structure, the combination of a strip magazine; a first transfer device; means for moving said first transfer device from a strip-receiving position to a strip-delivering position and returning it; means for feeding strips, one by one, from said magazine to said first transfer device, when it is in strip-receiving position; a second transfer device; means for moving said second transfer device from a strip-receiving position, in which it makes contact with a strip carried by the first transfer device in strip-delivering position, to the mouth of said passage and returning it, to deposit severable separator strips, one by one, therein, as said warp is plaited about the strips so deposited.

3. In a machine for making cemented pile fabric in which a warp is passed to and fro to the mouth of a confining passage for being plaited over severable separator strips for forming a plaited structure, the combination of a strip magazine; a first transfer device; means for moving said first transfer device from a strip-receiving position to a strip-delivering position and returning it; means for feeding strips, one by one, from said magazine to said first transfer device, when it is in strip-receiving position; a second transfer device; means for moving said second transfer device from a strip-receiving position, in which it makes contact with a strip carried by the first transfer device in strip-delivering position, to the mouth of said passage and returning it, to deposit severable separator strips, one by one, therein, as said warp is plaited about the strip so deposited; strip-retaining means normally projecting into the mouth of said passage about the strip last deposited; and means for withdrawing said strip-retaining means from the passage, at predetermined intervals, to permit the entrance of a strip therein.

4. In a machine for making cemented pile fabric in which a warp is passed to and fro to the mouth of a confining passage for being plaited over severable separator strips for forming a plaited structure, the combination of a strip magazine; a strip-feed slide; means for moving said strip-feed slide from a strip-receiving position, in which it receives a strip from said magazine, to a strip-delivering position and returning it; a first transfer device; means for moving said first transfer device from a strip-receiving position, in which it makes contact with a strip carried by said slide in strip-delivering position, to strip-delivering position and returning it; a second transfer device; and means for moving said second transfer device from a strip-receiving position, in which it makes contact with a strip carried by the first transfer device in strip-delivering position, to the mouth of said passage and returning it, to deposit severable separator strips, one by one, therein, as said warp is plaited about the strips so deposited.

5. In a machine for making cemented pile fabric in which a warp is passed to and fro to the mouth of a confining passage for being plaited over severable separator strips for forming a plaited structure, the combination of a strip magazine; a first transfer device; a second transfer device; means, active during certain portions of the cycle of operation, for moving said second transfer device from strip-receiving position to the mouth of said confining passage, and active during other portions of the cycle of operation for moving said second transfer device from the mouth of said passage to said strip-receiving position; means for moving said first transfer device from strip-receiving position to a strip-delivering position, in which a strip carried by said first transfer device makes contact with said second transfer device, and for returning said first transfer device to strip-receiving position, said means completing movement of said first transfer device to strip-delivering position and beginning movement of said device from said position while said second transfer device remains in strip-receiving position; and means for feeding strips, one by one, from said magazine to said first transfer device at strip-receiving position.

6. In a machine for making cemented pile fabric in which a warp is passed to and fro to the mouth of a confining passage for being plaited over separable separator strips for forming a plaited structure, the combination of a strip magazine; a first transfer device; a second transfer device; means, active during certain portions of the cycle of operation, for moving said second transfer device from a strip-receiving position to the mouth of said passage, and active during other portions of the cycle for returning said second transfer device from the mouth of said passage to said strip-receiving position; means for moving the first transfer device from strip-receiving position to strip-delivering position, in which a strip carried by the first transfer device makes contact with the second transfer device, and for returning said first transfer device to strip-receiving position, said means completing movement of said first transfer device to strip-delivering position and beginning movement of said device from said position while said second transfer device remains in strip-receiving position; strip-retaining means normally projecting into the mouth of said passage to retain therein the strip last deposited; and means for withdrawing said retaining means, as said second transfer device approaches the mouth of said passage.

7. In a machine for making cemented pile fabric in which a warp is passed to and fro to the mouth of a confining passage for being plaited over severable separator strips for forming a plaited structure, the combination of a strip magazine; a strip-feed slide; a first transfer device; a second transfer device; means, active during certain portions of the cycle of operation, for moving said second transfer device from strip-receiving position to the mouth of said passage, and active during other portions of the cycle of operation for returning said second transfer device to strip-receiving position; means for moving the first transfer device from strip-receiving position to strip-delivering position, in which a strip carried thereby makes contact with said second transfer device, and for returning said first transfer device to strip-receiving position, said means completing movement of said first transfer device to strip-delivering position and beginning movement of said device from said position while said second transfer device remains in strip-receiving position; and means for moving said strip-feed slide from a strip-receiving position, in which it receives a strip from the magazine, to a strip-delivering position, in which a strip carried thereby makes contact with said first transfer device, and for returning said slide to strip-receiving position, said means completing movement of said slide to strip-delivering position and beginning movement of said slide from said position while said first transfer device remains in strip-receiving position.

8. In a machine for making cemented pile fabric in which a warp is passed to and fro to the mouth of a confining passage for being plaited over severable separable strips for forming a plaited structure, the combination of a strip magazine; a first transfer device, having suction passages therein communicating with a face of said device to be engaged by a strip; means for moving said first transfer device from a strip-receiving position to a strip-delivering position and returning it; a second transfer device, having suction passages communicating with a face of said device to be engaged by a strip; means for moving said second transfer device to a strip-receiving position, in which it makes contact with a strip carried by the first transfer device in strip-delivering position, to the mouth of said passage and returning it, to deposit severable separator strips, one by one, therein, as said warp is plaited about the strips so deposited; suction connections to said suction passages; and means for controlling said suction connections, to apply and release the suction in said passages, and cause said transfer devices to grip and release a strip at proper points in the cycle.

9. In a machine for making cemented pile fabric in which a warp is passed to and fro to the mouth of a confining passage for being plaited over severable separator strips for forming a plaited structure, the combination of a strip magazine; a strip-feed slide, having suction passages therein communicating with a face of said slide adapted to be engaged by a strip; means for moving said slide from strip-receiving position to strip-delivering position and returning it; a first transfer device, having suction passages therein communicating with a face of said device adapted to be engaged by a strip; means for moving the first transfer device from a strip-receiving position, in which it makes contact with a strip carried by said slide in strip-delivering position, to a strip-delivering position and returning it; a second transfer device, having suction passages therein communicating with a face of said device adapted to be engaged by a strip; means for moving said second transfer device from a strip-receiving position, in which it makes contact with a strip carried by the first transfer device in strip-delivering position, to the mouth of said passage and returning it; suction connections to said suction passages; and means for controlling said suction connections, to apply and release the suction in said passages, whereby said slide and said transfer devices will be caused to grip and release a strip at proper points in the cycle of operation.

10. In a machine for making cemented pile fabric, in which a warp is passed to and fro to the mouth of a confining passage for being plaited over severable separator strips for forming a plaited structure, the combination of a pair of strip magazines, one on either side of the central vertical plane of said confining passage; a pair of upper transfer devices, one cooperating with each of said magazines, each movable between a strip-receiving position and a strip-delivering position; means for alternately moving said upper transfer devices between said positions; means, alternately operable, for feeding strips, one by one, from each of said magazines to the cooperating upper transfer device in strip-receiving position; a pair of lower transfer devices, one cooperating with each of the upper transfer devices, each movable between a strip-receiving position, in which it makes contact with a strip carried by the corresponding upper transfer device in strip-delivering position, and the mouth of said passage; and means, alternately operable, for moving said lower transfer devices between said strip-receiving position and the mouth of said passage, to deposit severable separator strips, one by one, therein, as said warp is plaited about the strips so deposited.

11. In a machine for making cemented pile fabric in which a warp is passed to and fro to the mouth of a confining passage for being plaited over severable separator strips for forming a plaited structure, the combination of a pair of strip magazines, one on either side of the central vertical plane of said passage; a pair of first transfer devices, one on either side of said central vertical plane; means for alternately moving said first transfer devices from strip-receiving position to strip-delivering position and return; a pair of second transfer devices, one on either side of said central vertical plane; and means for alternately moving said second transfer devices from strip-receiving position, in which the device makes contact with a strip carried by the corresponding first transfer device in strip-delivering position, to the mouth of said passage and return, to deposit severable separator strips, one by one, therein, as said warp is plaited about the strips so deposited.

12. In a machine for making cemented pile fabric in which a warp is passed to and fro to the mouth of a confining passage for being plaited over severable separator strips for forming a plaited structure, the combination of a pair of strip magazines, one on either side of the central vertical plane of said passage; a pair of first transfer devices, one on either side of said vertical plane; means for alternately moving said first transfer devices from strip-receiving position to strip-delivering position and return; a pair of second transfer devices, one on either side of said vertical plane; means for alternately moving said second transfer devices from strip-receiving position, in which the device makes contact with a strip carried by the corresponding first transfer device in strip-delivering position, to the mouth of said passage and return; strip-retaining means normally projecting into the mouth of said passage above the strip last deposited therein; and means, automatically operable at certain points in the cycle of operation, to withdraw said strip-returning means from said passage to permit the deposit of a strip therein, whereby severable separator strips are deposited, one by one, in the mouth of said confining passage, as said warp is plaited about the strips so deposited.

13. In a machine for making cemented pile fabric in which a warp is passed to and fro to the mouth of a confining passage for being plaited over severable separator strips for forming a plaited structure, the combination of a pair of strip magazines, one on either side of the central vertical plane of said passage; a pair of strip-feed slides, one for each magazine; a pair of first transfer devices, one for each of said slides; a pair of second transfer devices, one for each of said first transfer devices; means for alternately moving said strip-feed slides from strip-receiving position, in which a slide receives a strip from the corresponding magazine, to strip-delivering position and return; means for alternately moving said first transfer devices from strip-receiving position, in which the device makes contact with a strip carried by the corresponding slide in strip-delivering position, to strip-delivering position and return; and means for alternately moving said second transfer devices from strip-receiving position, in which the device makes contact with a strip carried by the corresponding first transfer device in strip-delivering position, to the mouth of said passage and return, whereby to deposit severable separator strips, one by one, in the mouth of said passage, as said warp is plaited about the strips so deposited.

14. In a machine for making cemented pile fabric in which a warp is passed to and fro to the mouth of a confining passage for being plaited over severable separator strips for forming a plaited structure, the combination of a pair of strip magazines, one on either side of the central vertical plane of said confining passage; a pair of first transfer devices, one on either side of said vertical plane; a pair of second transfer devices, one on either side of said vertical plane; means, effective in one half of the operative cycle, for moving one of said second transfer devices from the mouth of the passage to a strip-receiving position; means, effective during the other half of the cycle, for moving the other second transfer device from the mouth of said passage to strip-receiving position; means for moving the first transfer devices from strip-receiving position to strip-delivering position, in which a strip carried by a first transfer device makes contact with the corresponding second transfer device in strip-receiving position, and return, said means completing the movement of a first transfer device to strip-delivering position and beginning its movement from said position while the corresponding second transfer device remains in strip-receiving position; and means for feeding separator strips from the strip magazines alternately to the corresponding first transfer device in strip-receiving position, whereby the severable separator strips are deposited, one by one, in the mouth of the confining passage, as said warp is plaited about the strips so deposited.

15. In a machine for making cemented pile fabric in which a warp is passed to and fro to the mouth of a confining passage for being plaited over severable separator strips for forming a plaited structure, the combination of a pair of strip magazines, one on either side of the central vertical plane of said passage; a pair of feed slides, one cooperating with each magazine; a pair of first transfer devices, one cooperating with each slide; a pair of second transfer devices, one cooperating with each of the first transfer devices; means, acting during one half of the cycle, to move one of the second transfer devices from the mouth of the confining passage to a strip-receiving position; means, acting during the other half of the cycle, to move the other second transfer device from the mouth of the passage to strip-receiving position; means to move the first transfer devices from strip-receiving position to strip-delivering position, in which a strip carried by a first transfer device makes contact with the corresponding second transfer device in strip-receiving position, and return, said means completing the movement of a first transfer device to strip-delivering position and beginning its movement from said position while the corresponding second transfer device remains in strip-receiving position; and means for moving the strip-feed slides from strip-receiving position, in which a slide receives a strip from the corresponding magazine, to strip-delivering position, in which a strip carried thereby makes contact with the corresponding first transfer device, and for returning said slides to the strip-receiving position, said means completing movement of a slide to strip-delivering position and beginning movement of said slide from said position while the corresponding first transfer device remains in strip-receiving position, whereby the severable separator strips are deposited one by one in the mouth of the confining passage, as said warp is plaited about the strips so deposited.

16. In a machine for making cemented pile fabric in which a warp is passed to and fro to the mouth of a confining passage for being plaited over severable separator strips for forming a plaited structure, the combination of a pair of strip magazines, one on either side of the central vertical plane of said passage; a pair of first transfer devices, one cooperating with each of said magazines, each such device having suction passages therein communicating with a face of said device adapted to be engaged by a strip; a pair of second transfer devices, one cooperating with each of said first transfer devices, each of said second transfer devices having suction passages therein communicating with a face of said second transfer device adapted to be engaged by a strip; means, acting during one half of the cycle of operation, for moving one of said second transfer devices from the mouth of said passage to a strip-receiving position; means, acting during the other half of said cycle, for moving the other second transfer device from the mouth of said passage to strip-receiving position; means for moving the first transfer devices from strip-receiving position to strip-delivering position, in which a strip carried by a first transfer device engages the corresponding second transfer device, and for returning said first transfer devices to strip-receiving position, said means completing movement of a first transfer device to strip-delivering position and beginning its movement from said position while the corresponding second transfer device remains in strip-receiving position; means for feeding strips, one by one, from a magazine to the corresponding first transfer device in strip-receiving position; suction connections to said suction passages; and means controlling said suction connections, to apply and release suction at said suction passages to grip and release a strip at proper points in the cycle, whereby severable separator strips are deposited, one by one, in the mouth of the confining passage, as said warp is plaited about the strips so deposited.

17. In a machine for making cemented pile fabric in which a warp is passed to and fro to the mouth of a confining passage for being plaited over severable separator strips for forming a plaited structure, the combination of a pair of strip magazines, one on either side of the vertical central plane of said central passage; a pair of strip-feed slides, one cooperating with each magazine, each slide having suction passages therein communicating with a face thereof adapted to be engaged by a strip; a pair of first transfer devices, one cooperating with each of said slides, each transfer device having suction passages therein communicating with a face thereof adapted to be engaged by a strip; a pair of second transfer devices, one cooperating with each first transfer device, each second transfer device having suction passages therein communicating with a face thereof adapted to be engaged by a strip; means, acting during one-half of the cycle of operation, to move one of the second transfer devices from the mouth of the confining passage to a strip-receiving position; means, acting during the other half of the cycle, for moving the other second transfer device from the mouth of said passage to strip-receiving position; means for moving the first transfer devices from strip-receiving position to a strip-delivering position, in which a strip carried by a first transfer device makes contact with the corresponding second transfer device, and for returning said first transfer devices to strip-receiving position, said means completing movement of a first transfer device to strip-delivering position and beginning its movement from said position while the corresponding second transfer device remains in strip-receiving position; means for moving the strip-feed slides from strip-receiving position, in which a slide receives a strip from the corresponding magazine, to strip-delivering position, in which a strip carried thereby makes contact with the correspondng first transfer device, and for returning said slides to strip-receiving position, said means completing movement of a slide to strip-delivering position and beginning its movement from said position while the corresponding first transfer device remains in strip-receiving position; suction connections to said suction passages; and means controlling said suction connections, whereby suction is released and applied in said suction passages, at proper points in the cycle, to cause said slides, first transfer devices and second transfer devices to release and grip a strip at proper points in the cycle, whereby severable separator strips are successively withdrawn from said magazines and deposited, one by one, in the mouth of the confining passage, as said warp is plaited about the strips so deposited.

18. In a machine for making cemented pile fabric in which a warp is passed to and fro to the mouth of a confining passage for being plaited over severable separator strips for forming a plaited structure, the combination of a warp guide, having a throat through which the warp passes to the mouth of said passage; and means for moving the throat of said warp guide to and fro, in a semi-circular path, over the mouth of said passage.

19. In a machine for making cemented pile fabric in which a warp is passed to and fro to the mouth of a confining passage for being plaited over severable separator strips for forming a plaited structure, the combination of a warp guide, having a throat, through which said warp passes to the mouth of said passage, and a plurality of reed partitions, between which the individual yarns of the warp pass; and means for moving the throat of said warp guide to and fro, in a semi-circular path, over the mouth of said passage.

20. In a machine for making cemented pile fabric in which a warp is passed to and fro to the mouth of a confining passage for being plaited over severable separator strips for forming a plaited structure, the combination of a warp guide, having a pair of spaced parallel rods forming a throat, and between which said warp passes to the mouth of said passage, and a plurality of reed partitions, between which the individual yarns of the warp pass; and means for moving the throat of said warp guide to and fro, in a semi-circular path, over the mouth of said passage.

21. In a machine for making cemented pile fabric in which a warp is passed to and fro to the mouth of a confining passage for being plaited over severable separator strips for forming a plaited structure, the combination of a warp guide comprising a pair of end members, a pair of parallel spaced rods secured to said end members and forming a throat through which the warp passes to the mouth of said passage, and a plurality of reed partitions, between which the individual yarns of the warp pass; and means acting on said end members to move said throat to and fro, in a semi-circular path, over the mouth of said passage.

22. In a machine for making cemented pile fabric in which a warp is passed to and fro to the mouth of a confining passage for being plaited over severable separator strips for forming a plaited structure, the combination of a warp guide comprising a pair of end members, a pair of parallel spaced rods secured to said end members and forming a throat through which the warp passes to the mouth of said passage, and a plurality of reed partitions, between which the individual yarns of the warp pass; trunnions carried by said end members; vertically sliable bearings in which said trunnions are journaled; and means acting on said end members to move said throat to and fro over the mouth of said passage.

23. In a machine for making cemented pile fabric in which a warp is passed to and fro to the mouth of a confining passage for being plaited over severable separator strips for forming a plaited structure, the combination of a warp guide comprising a pair of end members, a pair of parallel spaced rods secured to said end members and forming a throat through which the warp passes to the mouth of said passage, and a plurality of reed partitions, between which the individual yarns of the warp pass; trunnions carried by said end members; vertically slidable bearings in which said trunnions are journaled; a wrist pin carried by each of said end members; and means for moving said wrist pins in circular paths.

24. In a machine for making cemented pile fabric in which a warp is passed to and fro to the mouth of a confining passage for being plaited over severable separator strips for forming a plaited structure, the combination of a warp guide comprising a pair of end members, a pair of parallel spaced rods secured to said end members and forming a throat through which the warp passes to the mouth of said passage, and a plurality of reed partitions, between which the individual yarns of the warp pass; trunnions carried by said end members; vertically slidable bearings in which said trunnions are journaled; a wrist pin carried by each of said end members; a shaft at each end of said warp guide; a bearing mounted eccentrically on each of said shafts in which bearing said wrist pins are journaled; and means for oscillating said shafts.

25. In a machine for making cemented pile fabric in which a warp is passed to and fro to the mouth of a confining passage for being plaited over severable separator strips for forming a plaited structure, the combination of a warp guide comprising a pair of end members, a pair of parallel spaced rods secured to said end members and forming a throat through which the warp passes to the mouth of said passage, and a plurality of reed partitions, between which the individual yarns of the warp pass; trunnions carried by said end members; vertically slidable bearings in which said trunnions are journaled; a wrist pin carried by each of said end members; a shaft at each end of said warp guide; a bearing mounted eccentrically on each of said shafts and in which said wrist pins are journaled; a pinion fixed on each of said shafts; a slidable rack meshing with each of said pinions; and means for reciprocating said racks.

26. In a machine for making cemented pile fabric in which a warp is passed to and fro to the mouth of a confining passage for being plaited over severable separator strips for forming a plaited structure, the combination of a warp guide comprising a pair of end members, a pair of parallel spaced rods secured to said end members and forming a throat through which the warp passes to the mouth of said passage, and a plurality of reed partitions, between which the individual yarns of the warp pass; trunnions carried by said end members; vertically slidable bearings in which said trunnions are journaled; a wrist pin carried by each of said end members; a shaft at each end of said warp guide; a bearing mounted eccentrically on each of said shafts and in which said wrist pins are journaled; a pinion fixed on each of said shafts; a slidable rack meshing with each of said pinions; pivoted bell cranks each having one arm connected to one of said racks; links connected to the other arms of said bell cranks; an operating shaft; and an eccentric pin at each end thereof pivotally connected to one of said links.

27. In a machine for making cemented pile fabric in which a warp is passed to and fro to the mouth of a confining passage for being plaited over severable separator strips for forming a plaited structure, the combination of a lower transfer device; means for moving it from the mouth of said passage to a strip-receiving position and returning it to said mouth; an upper transfer device; and means for moving it from a strip-receiving position, in which it receives a strip from said feeding means, to a strip-delivering position, in which it delivers said strip to said lower transfer device.

28. In a machine for making cemented pile fabric in which a warp is passed to and fro to the mouth of a confining passage for being plaited over severable separator strips for forming a plaited structure, the combination of a lower transfer device; means for moving it from the mouth of passage to a strip-receiving position and returning it to said mouth; an upper transfer device; and means for moving it from a strip-receiving position, in which it receives a strip from said feeding means, to a strip-delivering position, in which a strip carried thereby makes contact with said lower transfer device in strip-receiving position, and returning it to said strip-receiving position.

29. In a machine for making cemented pile fabric in which a warp is passed to and fro to the mouth of a confining passage for being plaited over severable separator strips for forming a plaited structure, the combination of a lower transfer device; means, acting during a part of the cycle of operation, to move said lower transfer device from the mouth of said passage to strip-receiving position and acting, during another part of the cycle, to return it to said mouth; an upper transfer device; and means acting, while said lower transfer device is moving from strip-depositing to strip-receiving position, to move said upper transfer device from strip-receiving position, in which it receives a strip from said feeding means, to strip-delivering position, in which it delivers said strip to the lower transfer device, and acting to return said upper transfer device to strip-receiving position while said lower transfer device moves from strip-receiving to strip-depositing position.

30. In a machine for making cemented pile fabric in which a warp is passed to and fro to the mouth of a confining passage for being plaited over severable separator strips for forming a plaited structure, the combination of a lower transfer shaft; a plurality of arms secured thereto; a lower transfer bar carried by said arms; means for rocking said shaft to carry said lower transfer bar from a strip-depositing position at the mouth of said passage to a strip-receiving position and to return said lower transfer bar to strip-depositing position; an upper transfer shaft; a plurality of arms secured thereto; an upper transfer bar carried by said arms; and means for rocking said upper transfer shaft to carry said upper transfer bar from strip-receiving position, in which it receives a strip from said feeding means, to strip-delivering position, in which a strip carried thereby makes contact with said lower transfer bar in strip-receiving position, and to return said upper transfer bar to strip-receiving position.

31. In a machine for making cemented pile fabric in which a warp is passed to and fro to the mouth of a confining passage for being plaited over severable separator strips for forming a plaited structure, the combination of a lower transfer shaft; a plurality of arms secured thereto; a lower transfer bar carried by said arms; means, active during a part of the cycle of operation, to rock said shaft to carry said lower transfer bar from strip-depositing position at the mouth of said passage to strip-receiving position, and active, during another part of the cycle of operation, to rock said shaft to return said lower transfer bar to said strip-depositing position; an upper transfer shaft; a plurality of arms secured thereto; an upper transfer bar carried by said arms; and means, active while said lower transfer bar is moving from strip-depositing to strip-receiving position, for rocking said upper transfer shaft to carry said upper transfer bar from strip-receiving position, in which it receives a strip from said feeding means, to strip-delivering position, in which a strip carried thereby makes contact with said lower transfer bar in strip-receiving position, and active to return said upper transfer bar to strip-receiving position while said lower transfer bar is moving from strip-receiving to strip-depositing position.

32. In a machine for making cemented pile fabric in which a warp is passed to and fro to the mouth of a confining passage between a pair of spaced members for being plaited over severable separator strips for forming a plaited structure, the combination of a retaining finger bar horizontally slidable on one of said members, and having a laterally-extending yoke; a plurality of retaining fingers mounted on said bar, and having portions normally projecting over the mouth of said passage; spring means tending to hold said bar in normal position, with said portions projecting over said mouth; a rock shaft journaled on said members; a rock arm fixed to said rock shaft and extending within said laterally-extending yoke, in engagement with said bar; and means for rocking said shaft, at a predetermined point in the cycle, to shift said bar against said spring pressure and withdraw said fingers from the mouth of said passage.

33. In a machine for making cemented pile fabric in which a warp is passed to and fro to the mouth of a confining passage between a pair of spaced members for being plaited over severable separator strips for forming a plaited structure, the combination of a retaining finger bar, horizontally slidable upon one of said members and having a laterally-extending yoke; a plurality of retaining fingers mounted on said bar, and having portions normally projecting over the mouth of said passage; spring means tending to move said bar to normal position, in which said fingers project over the mouth of said passage; a rock shaft journaled on said members; a rock arm fixed to said rock shaft and extending within said laterally-extending yoke, in engagement with said bar; a cam arm fixed to said rock shaft; a cam shaft; a cam fast thereto and cooperating with said cam arm; and means for rotating said cam shaft; whereby to shift said bar against said spring pressure, at a predetermined point in the cycle of operation, to withdraw said fingers from the mouth of said passage.

34. In a machine for making cemented pile fabric in which a warp is passed to and fro to the mouth of a confining passage between a pair of spaced members for being plaited over severable separator strips for forming a plaited structure, the combination of supporting brackets mounted on one of said members, each having a guideway formed therein; a retaining finger bar, having guides at each end thereof slidable in said guideways, and a laterally-extending yoke; a plurality of retaining fingers mounted on said bar, and having portions normally projecting over the mouth of said passage; spring means acting on said bar and tending to hold it in normal position with said fingers projecting over the mouth of said passage; and means for shifting said bar against the pressure of said spring means, at a predetermined point in the cycle of operation, to withdraw said fingers from the mouth of said passage.

35. In a machine for making cemented pile fabric in which a warp is passed to and fro to the mouth of a confining passage between a pair of spaced members for being plaited over severable separator strips for forming a plaited structure, the combination of supporting brackets mounted on one of said members, each having a guideway formed therein; a retaining finger bar, having guides at each end thereof slidable in said guideways, and a laterally-extending yoke; a plurality of retaining fingers mounted on said bar, and having portions normally projecting over the mouth of said passage; spring means acting on said bar and tending to hold it in normal position with said fingers projecting over said mouth; a rock shaft journaled on said members; a rock arm fixed to said rock shaft and extending within said laterally-extending yoke, in engagement with said bar; and means for rocking said shaft, at a predetermined point in the cycle, to shift said bar against said spring means to withdraw said fingers from the mouth of said passage.

36. In a machine for making cemented pile fabric in which a warp is passed to and fro to the mouth of a confining passage between a pair of spaced members for being plaited over severable separator strips for forming a plaited structure, the combination of supporting brackets mounted on one of said members, each having a guideway formed therein; a retaining finger bar, having guides at each end thereof slidable in said guideways, and a laterally-extending yoke; a plurality of retaining fingers mounted on said bar, and having portions normally projecting over the mouth of said passage; spring means acting on said bar and tending to hold it in normal position, with said fingers projecting over said mouth; a rock shaft journaled on said members; a rock arm fixed to said rock shaft and extending within said laterally-extending yoke, in engagement with said bar; a cam arm fixed to said rock shaft; a cam shaft; a cam fast thereto and cooperating with said cam arm; and means for rotating said cam shaft, whereby to shift said bar against the pressure of said spring means, at a predetermined point in the cycle, to withdraw said fingers from the mouth of said passage.

37. In a machine for making cemented pile fabric, including a pair of spaced members forming a confining passage in which is received a plaited structure formed from severable separator strips and a warp, means for depositing separator strips, one by one, in the mouth of said passage, and means for plaiting said warp about said strips as they are so deposited, the combination of a frame; means for slidably mounting said members on said frame; adjustable means for sliding said members toward and from each other, to vary the width of said passage; and releasable means for clamping said members to said frame in adjusted positions.

38. In a machine for making cemented pile fabric, including a pair of spaced members forming a confining passage in which is received a plaited structure formed from severable separator strips and a warp, means for depositing separator strips, one by one, in the mouth of said passage, and means for plaiting said warp about said strips as they are so deposited, the combination of a pair of end frame members; means for slidably mounting said passage-forming members on said end frame members; independently adjustable means, one adjacent each end frame member, for sliding the corresponding ends of said passage-forming members toward and from each other, to vary the width of said passage; and independently releasable means, one cooperating with each of said end frame members, for clamping said passage-forming members to said end frame members in adjusted positions.

39. In a machine for making cemented pile fabric, including a pair of spaced members forming a confining passage in which is received a plaited structure formed from severable separator strips and a warp, means for depositing separator strips, one by one, in the mouth of said passage, and means for plaiting said warp about said strips as they are so deposited, the combination of a pair of end frame members, each having guideways formed therein; guides secured to the ends of said passage-forming members, and slidable in said guideways; two pairs of spaced adjusting lugs secured to said guides, one pair at each of the ends of said passage, said lugs being slidable in the end frame members; a pair of adjusting screws, each having oppositely-threaded ends in screw thread engagement with the adjacent lugs; and means for preventing longitudinal movement of said screws with respect to the end frame members.

40. In a machine for making cemented pile fabric, including a pair of spaced members forming a confining passage in which is received a plaited structure formed from severable separator strips and a warp, means for depositing separator strips, one by one, in the mouth of said passage, and means for plaiting said warp about said strips as they are so deposited, the combination of a pair of end frame members, each having guideways formed therein; guides secured to the ends of said passage-forming members, and slidable in said guideways; two pairs of spaced adjusting lugs secured to said guides, one pair of lugs being slidable in each of the end frame members; a pair of adjusting screws, each having oppositely-threaded ends in screw thread engagement with the adjacent lugs; means for preventing longitudinal movement of said screws with respect to the end frame members; bolts secured to said passage-forming members, and extending through said lugs and through slots in said end frame members; and nuts screwed on said bolts and engaging said end frame members.

PAUL S. SMITH.

REFERENCES CITED

The following references are of record in the file of this patent:

UNITED STATES PATENTS

| Number | Name | Date |
| --- | --- | --- |
| 1,671,688 | Staud | May 29, 1928 |
| 2,084,065 | Reinartz | June 15, 1937 |
| 2,110,175 | Reinartz | Mar. 8, 1938 |
| 2,213,502 | Parkes et al. | Sept. 3, 1940 |
| 2,302,722 | Smith | Nov. 24, 1942 |
| 2,313,100 | Stevens | Mar. 9, 1943 |